US011564089B2

(12) United States Patent
Kim et al.

(10) Patent No.: US 11,564,089 B2
(45) Date of Patent: Jan. 24, 2023

(54) APPARATUS FOR IOT REGISTRATION AND METHOD FOR AUTHENTICATION AND ASSOCIATION USING THE APPARATUS

(71) Applicant: Industry Academic Cooperation Foundation Of Yeungnam University, Gyeongsan-si (KR)

(72) Inventors: Young-Tak Kim, Gyeongsan-si (KR); Nurullah Shahin, Gyeongsan-si (KR)

(73) Assignee: Industry Academic Cooperation Foundation Of Yeungnam University, Gyeonsan-Si (KR)

( * ) Notice: Subject to any disclaimer, the term of this patent is extended or adjusted under 35 U.S.C. 154(b) by 649 days.

(21) Appl. No.: 15/962,506

(22) Filed: Apr. 25, 2018

(65) Prior Publication Data

US 2018/0310175 A1    Oct. 25, 2018

(30) Foreign Application Priority Data

Apr. 25, 2017 (KR) .................. 10-2017-0052853
Mar. 29, 2018 (KR) .................. 10-2018-0036421

(51) Int. Cl.
*H04W 12/06* (2021.01)
*H04W 60/00* (2009.01)
(Continued)

(52) U.S. Cl.
CPC .......... *H04W 12/06* (2013.01); *H04J 3/02* (2013.01); *H04L 63/0876* (2013.01);
(Continued)

(58) Field of Classification Search
None
See application file for complete search history.

(56) References Cited

U.S. PATENT DOCUMENTS 9,107,220 B1 * 8/2015 Sherman ............... H04L 12/413
9,125,105 B2    9/2015 Kwon et al.
(Continued)

FOREIGN PATENT DOCUMENTS

EP    2547008 A2    1/2013
EP    2496046 B1 *  4/2016 ............ H04W 48/12
(Continued)

OTHER PUBLICATIONS

Zhang, L., Liu, Z., Zou, R. et al. A Scalable CSMA and Self-Organizing TDMA MAC for IEEE 802.11 p/1609.x in VANETs. Wireless Pers Commun 74, 1197-1212 (2014). https://doi.org/10.1007/s11277-013-1572-3.*

(Continued)

*Primary Examiner* — Jeffrey Nickerson
*Assistant Examiner* — Vadim Savenkov
(74) *Attorney, Agent, or Firm* — Osha Bergman Watanabe & Burton LLP

(57) ABSTRACT

An apparatus for Internet of Things (IoT) registration includes a beacon frame transmitting unit for transmitting a beacon frame to a plurality of stations, an authentication unit that receives an authentication request frame from the plurality of stations in a first method, and an association unit that transmits an authentication response frame or an association response frame to the plurality of stations in a second method.

15 Claims, 14 Drawing Sheets

(51) Int. Cl.
*H04L 9/40* (2022.01)
*H04J 3/02* (2006.01)
*H04W 4/70* (2018.01)
*H04W 74/08* (2009.01)
*H04L 67/12* (2022.01)
*H04W 80/02* (2009.01)
*H04W 4/80* (2018.01)

(52) U.S. Cl.
CPC ............ *H04W 4/70* (2018.02); *H04W 60/00* (2013.01); *H04L 67/12* (2013.01); *H04W 4/80* (2018.02); *H04W 74/085* (2013.01); *H04W 80/02* (2013.01)

(56) References Cited

U.S. PATENT DOCUMENTS

| | | | |
|---|---|---|---|
| 9,906,987 B2 | 2/2018 | Kwon et al. | |
| 2005/0170835 A1* | 8/2005 | Ayyagari | H04L 5/0039 455/437 |
| 2006/0009229 A1* | 1/2006 | Yuan | H04W 72/14 455/452.1 |
| 2006/0034219 A1* | 2/2006 | Gu | H04L 47/72 370/329 |
| 2008/0008138 A1* | 1/2008 | Pun | H04W 74/0841 370/338 |
| 2008/0089311 A1* | 4/2008 | Roy | H04L 67/12 370/345 |
| 2008/0101253 A1* | 5/2008 | Shvodian | H04J 3/0682 370/252 |
| 2008/0112371 A1* | 5/2008 | Joshi | H04W 74/02 370/337 |
| 2010/0220690 A1* | 9/2010 | Majkowski | H04W 76/14 370/336 |
| 2010/0226343 A1* | 9/2010 | Hsu | H04W 74/02 370/336 |
| 2011/0110340 A1* | 5/2011 | Lakkis | H04W 74/0816 370/336 |
| 2011/0310770 A1* | 12/2011 | Liang | H04W 84/18 370/254 |
| 2012/0063397 A1* | 3/2012 | Abedi | H04W 74/00 370/329 |
| 2012/0099559 A1* | 4/2012 | Yoshizawa | H04W 72/00 370/330 |
| 2013/0003689 A1 | 1/2013 | Kwon et al. | |
| 2013/0279491 A1* | 10/2013 | Rubin | G08G 1/162 370/347 |
| 2015/0003358 A1 | 1/2015 | Wang et al. | |
| 2015/0373589 A1 | 12/2015 | Kwon et al. | |
| 2016/0029346 A1* | 1/2016 | Suresh | G08B 25/10 340/539.16 |
| 2016/0257536 A1* | 9/2016 | Weiss | H04W 24/08 |
| 2016/0381596 A1* | 12/2016 | Hu | H04B 7/0617 370/236 |
| 2017/0257814 A1* | 9/2017 | Kim | H04W 40/244 |
| 2018/0184335 A1 | 6/2018 | Kwon et al. | |

FOREIGN PATENT DOCUMENTS

KR 2011-0102847 A 9/2011
WO WO-2009078519 A1 * 6/2009 ........ H04W 52/0216

OTHER PUBLICATIONS

Y. C. Tay, K. Jamieson and H. Balakrishnan, "Collision-minimizing CSMA and its applications to wireless sensor networks," in IEEE Journal on Selected Areas in Communications, vol. 22, No. 6, pp. 1048-1057, Aug. 2004, doi: 10.1109/JSAC.2004.830898.*

Bharat Shrestha, Ekram Hossain, & Kae Won Choi (2014). Distributed and Centralized Hybrid CSMA/CA-TDMA Schemes for Single-Hop Wireless Networks. IEEE Transactions on Wireless Communications, 13(7), 4050-4065.*

Y. Fu, Z. Ding and D. Wang, "A new type of portable MANET terminal with two modes of CSMA and SOTDMA," 2017 3rd IEEE International Conference on Computerand Communications (ICCC), 2017, pp. 443-452, doi: 10.1109/CompComm.2017.8322587.*

Aji, Rizal & Suhartanto, Heru & Yazid, Setiadi. (2018). A sense-based registration process for TDMA in IEEE 802.11 network. International Journal of Electrical and Computer Engineering. 8. 355-359. 10.11591/ijece.v8i1.pp. 355-359.*

N. Gao, L. Tang, S. Li and Q. Chen, "A hybrid clustering-based MAC Protocol for Vehicular Ad Hoc Networks," 2014 International Workshop on High Mobility Wireless Communications, 2014, pp. 183-187, doi: 10.1109/HMWC.2014.7000238.*

Shrestha, Bharat, "Analysis of Hybrid CSMA/CA-TDMA Channel Access Schemes with Application to Wireless Sensor Networks", University of Manitoba (2013) <http://hdl.handle.net/1993/22284>, Nov. 27, 2013 (159 pages).

Office Action Issued in corresponding Korean Patent Application No. 10-2018-0036421 dated May 14, 2018, with translation (8 pages).

* cited by examiner

FC: Frame Control
D: Duration
DA: Destination Address
RF: Registration Field
FCS: Frame Check Sequence DT: Data Type (e.g. Registration / DRA etc.)
TSN: TDMA Slot Number
AAN: Authentication Algorithm Number
ATSN: Authentication Transaction Sequence Number
SC: Status Code

APPARATUS FOR IOT REGISTRATION AND METHOD FOR AUTHENTICATION AND ASSOCIATION USING THE APPARATUS

CROSS-REFERENCE TO RELATED APPLICATIONS

This application claims priority under 35 U.S.C. § 119(a) to Korean Patent Application Nos. 10-2017-0052853 and 10-2018-0036421 filed on Apr. 25, 2017, and Mar. 29, 2018, respectively, with the Korean Intellectual Property Office, the entire disclosure of which is incorporated herein by reference for all purposes.

BACKGROUND

1. Field

The present disclosure relates to an apparatus for Internet of Things (IoT) registration and a method for authentication and association using the apparatus, and in particular to, an apparatus for IoT registration and a method for authentication and association using the apparatus that authenticate and associate connections of stations by using a hybrid access control scheme.

2. Description of Related Art

Machine-to-Machine (M2M) communications is an essential part of the emerging Internet of Things (IoT), which exchanges information among autonomous sensors/actuators without human interaction. The future generations of wireless IoT devices are expected to be intelligent and more efficient, with interconnections to the global internet. The deployment of smart devices serving various IoT applications is estimated to grow to over 30 billion globally by 2020. The IEEE 802. 11ah Task Group is working on a draft amendment for standardization that addresses efficient M2M network support for large numbers of devices, long transmission ranges, short and infrequent data transmissions, and very low power consumption. Smart and efficient management of massive registrations is one of the key requirements needed to build scalable, flexible, and dynamic networks for IoT applications.

In order to handle large numbers of devices in M2M communications, an IEEE 802.11ah wireless local area network (WLAN) must support up to 8000 devices connected to a single access point (AP) with a transmission range of up to 1 Km. A registration procedure must be completed before exchanging sensor/actuator data from/to devices.

The registration process includes an authentication request (AuthReq), an authentication response (AuthResp), an association request (AssocResp), and an association response (AssocResp), and therefore, a four-way handshake mechanism is used. All devices in the network send AuthReqs and AssocReqs, and the AP responds with AuthResps and AssocResps. The devices obtain an association identification (AID) and get permission to exchange application data after a successful registration procedure.

Currently, in an IEEE 802.11ah WLAN, carrier-sense multiple access with collision avoidance (CSMA/CA) is used to exchange the request/response messages of the registration process. Even though CSMA/CA is a popular contention-based random access protocol with high flexibility, scalability, and robustness, the congestion level gradually increases as the network size grows. Therefore, the CSMA/CA is not efficient enough when huge numbers of M2M devices try to access a single centralized AP all at once. Moreover, due to the four-way handshake in the registration process, every IoT apparatus must access the channel twice (i.e., AuthReq and AssocReq). If 8000 devices are in the M2M network, a total of 16,000 messages are sent to the AP. Therefore, massive numbers of CSMA/CA-based accesses produce severe collisions, so a long time is spent in completing the registration procedures.

In addition, stations in IEEE 802.11ah use CSMA/CA, where the backoff slot is randomly chosen in the contention resolution procedure based on a uniform distribution that provides the same probability of channel collision in any one slot. Although every station has an equal opportunity to pick one of the K backoff slots, the network experiences high contention at the beginning of each C-slot window. As a result, collision frequently occurs at the beginning of C-slot.

Contrary to CSMA/CA, Time Division Multiple Access (TDMA) is a collision-free access scheme that avoids competition for channel access. The transmission time is divided into slots, where each slot is allocated to a device via appropriate scheduling, and each device attempts to transmit only during its assigned TDMA slot (T-slot). The major advantage of TDMA is higher channel utilization, because there are no collisions during channel access. The AP first checks the availability of T-slots, assigns the available T-slots, and informs the nodes of their allocated T-slot. However, before the registration procedure, the AP does not have any of the information required for proper T-slot scheduling in a real environment.

At any time, the network may have to restart or reinitialize for various reasons, such as an AP reboot, a system crash, a power failure, and so on. Once the AP restarts, devices simultaneously try to reconnect, and the whole registration process takes a long time to complete for up to 8000 devices. In addition, the devices are not used during the registration process.

There are several approaches to mitigating sever contention during registration process. The IEEE 802.11ah standard introduced a centralized authentication control (CAC) method that limits the number of devices accessing the communications channel to send AuthReq and AssocReq messages. This method offers several parameters to achieve the optimal number of successful AuthReqs; however, it does not provide an appropriate procedure for selecting the optimal CAC parameters.

In this way, when there are many stations connected to an Access Point and a large number of stations attempt to access at the same time, collision occurs and effective data transmission capacity (that is, throughput) is greatly lower.

SUMMARY

This Summary is provided by way of example to introduce a selection of concepts in a simplified form that are further described below in the Detailed Description. This Summary is not intended to identify key features or essential features of the claimed subject matter.

An apparatus for Internet of Things (IoT) registration and a method for authentication and association using the apparatus according to one or more embodiments of the invention suggest a hybrid access control and registration method that minimizes collision occurrence even when many IoT stations attempt to register simultaneously in a situation where a large-scale IoT station needs to be managed and allows a plurality of IoT stations to complete registration in a short time.

In one general aspect, a station authentication apparatus for Internet of Things (IoT) registration according to one or more embodiments include: a beacon frame transmitting unit for transmitting a beacon frame to a plurality of stations, an authentication unit for receiving an authentication request frame from the plurality of stations in a first method; and an association unit for transmitting an authentication response frame or an association response frame to each of the stations in a second method, being different from the first method.

The beacon frame may include at least one of information on beacon interval, beacon period, authentication control threshold value, Medium Access Control (MAC) address for a non-registered station, and association identification of a registered station using a T-slot.

The first method may be slotted Carrier Sense Multiple Access with Collision Avoidance (slotted-CSMA/CA), and the beacon frame further may include information on a slotted-CSMA/CA period, a beginning of the slotted-CSMA/CA period, number of total C-slots, and duration of each C-slot.

The second method may be Time Division Multiple Access (TDMA), and the beacon frame may further include information on slotted-TDMA period, the number of total T-slots, and duration of each T-slot.

The beacon frame transmitting unit may increment or initialize the authentication control threshold value under a predetermined condition based on management queue size of the station authentication apparatus and the number of successful authentications and/or associations in a previous beacon interval.

The beacon frame transmitting unit may decrement or initialize the authentication control threshold value under a predetermined condition based on management queue size of the station authentication apparatus and number of successful authentications and/or associations in a previous beacon interval.

The first method may be slotted Carrier Sense Multiple Access with Collision Avoidance (slotted-CSMA/CA), and the second method may be Time Division Multiple Access (TDMA). The beacon frame may further include information on slotted-CSMA/CA period, slotted-TDMA period, and number of total T-slots. The beacon frame transmitting unit may set the slotted-CSMA/CA period and the slotted-TDMA period under a predetermined condition based on number of total authentication requests and the number of total T-slots in a previous beacon interval.

In another general aspect, a method for authentication and association of an apparatus for Internet of Things (IoT) registration according to one or more embodiments includes: receiving an authentication request frame from a plurality of stations in a first method; transmitting a resource allocation frame to the plurality of stations; receiving an association request frame from at least one station receiving an association response frame out of the plurality of stations in a second method; and transmitting an association response frame to the station in the second method.

The first method may be slotted Carrier Sense Multiple Access with Collision Avoidance (slotted-CSMA/CA), and the second method may be Time Division Multiple Access (TDMA).

The method may further include, before the reception of the authentication request frame, transmitting a beacon frame from the apparatus to the plurality of stations.

The beacon frame may include at least one of information on: slotted Carrier Sense Multiple Access with Collision Avoidance, resource allocation, TDMA period, and authentication control threshold value.

The transmission of the beacon frame may include: setting the authentication control threshold value to be incremented or initialized under a predetermined condition based on management queue size of the apparatus and number of successful authentications and/or associations in a previous beacon interval; and transmitting a beacon frame including the set authentication control threshold value to the plurality of station.

The transmission of the beacon frame may include: setting the authentication control threshold value to be incremented or initialized under a predetermined condition based on management queue size of the apparatus, number of successful authentications and/or associations in a previous beacon interval, and previous authentication control threshold value; and transmitting a beacon frame including the set authentication control threshold value to the plurality of stations.

In another general aspect, a method for authentication and association of an apparatus for Internet of Things (IoT) registration according to one or more embodiments includes: transmitting a beacon frame to a plurality of stations; receiving an authentication request frame from the each station receiving the beacon frame in a first method; transmitting an authentication response frame to a corresponding station in a second method; receiving an association request frame from each station receiving the authentication response frame in the second method; and transmitting an association response frame to a corresponding station in the second method.

The beacon frame may include at least one information of beacon interval, beacon period, authentication control threshold value, Medium Access Control (MAC) address for a non-registered station, and Association Identification of a registered station using a T-slot.

The first method is slotted Carrier Sense Multiple Access with Collision Avoidance (slotted-CSMA/CA), and the second method is Time Division Multiple Access. The beacon frame further may include information on a slotted-CSMA/CA period, a beginning of the slotted-CSMA/CA period, number of total C-slots, and duration of each C-slot, and a slotted-TDMA period, and number of total T-slots and duration of each T-slot.

The method may further include, before the transmission of the beacon frame, adaptively adjusting duration of the slotted-CSMA/CA period and duration of the slotted-TDMA period.

The adjustment may include: setting a current slotted-CSMA/CA period under a predetermined condition; and setting a current slotted-TDMA period by subtracting the current slotted-CSMA/CA period and the beacon period from the beacon interval.

The number of total C-slots may be number of C-slots included in one slotted-CSMA/CA period and is an integer greater than or equal to 2 and less than or equal to 4.

The reception of the authentication request frame may include: generating a uniform random number in a predetermined range by each station receiving the beacon frame; and receiving the authentication request frame from the station that belongs to the access group in the first method, if the uniform random number is less than or equal to the authentication control threshold value, the station belongs to an access group, if the uniform random number is greater than the authentication control threshold value, the station belongs to a deferred group.

In the reception of each authentication request frame, the first method may be slotted Carrier Sense Multiple Access with Collision Avoidance (slotted-CSMA/CA). Each of the plurality of stations receiving the beacon frame may use an $N^{th}$ backoff slot selected by Sift geometric probability distribution and transmit the authentication request frame, where N is a natural number.

The method may further include, before the transmission of the beacon frame, setting the authentication control threshold value to be incremented or initialized under a predetermined condition based on management queue size of the apparatus and number of successful authentications and/or associations in a previous beacon interval.

The method may further include, before the transmission of the beacon frame, setting the authentication control threshold value to be decremented or initialized under a predetermined condition based on management queue size of the apparatus, number of successful authentications and/or associations in a previous beacon interval, and previous authentication control threshold value.

An apparatus for IoT registration and a method for authentication and association using the apparatus according to one or more embodiments greatly reduces collision occurrence even when a plurality of IoT stations attempt to register at the same time, thereby increasing bandwidth utilization and data transmission efficiency.

In addition, an apparatus for IoT registration and a method for authentication and association using the apparatus according to one or more embodiments selects an optimal CAC parameter ($V_{ACT}$) according to a modified algorithm, thereby reducing authentication time for a large network with heavy background traffic.

In addition, an apparatus for IoT registration and a method for authentication and association using the apparatus according to one or more embodiments reduce the number of collisions occurring at the beginning of the authentication by using Sift geometric probability distribution.

In addition, an apparatus for IoT registration and a method for authentication and association using the apparatus according to one or more embodiments efficiently utilizes channel by adaptively adjusting SCP and STP.

In addition, an apparatus for IoT registration and a method for authentication and association using the apparatus according to one or more embodiments greatly reduces collision occurrence, thereby reducing the overall registration time for all stations.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
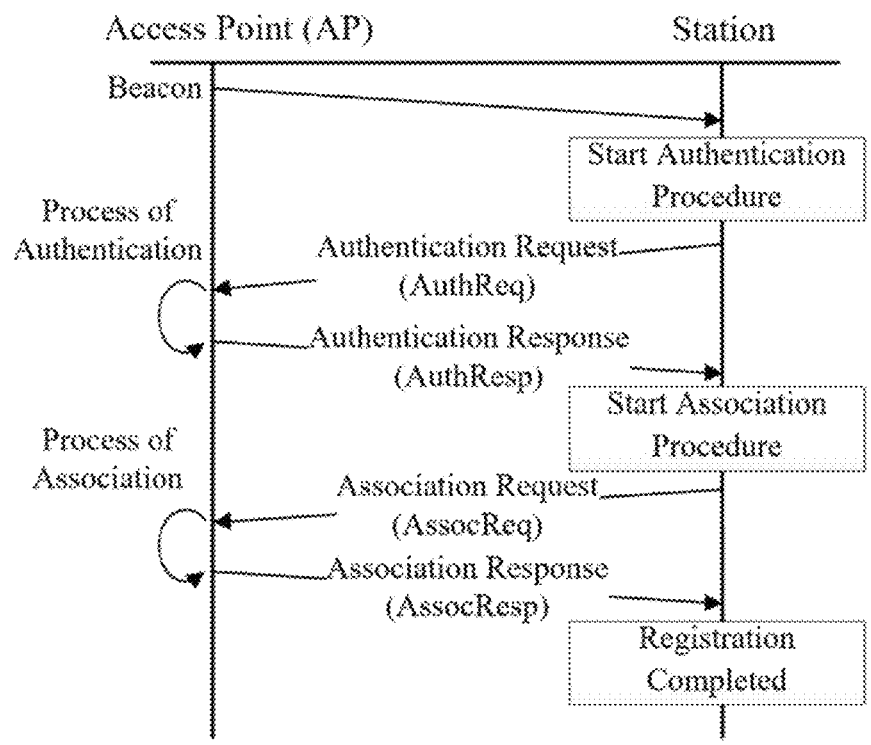
FIG. 1 is a drawing of a basic registration procedure under IEEE 802.11ah.

FIG. 1 is a drawing of a basic registration procedure under IEEE 802.11ah.

The registration procedure includes a four-way handshake of an authentication request (AuthReq), an authentication response (AuthResp), an association request (AssocReq), and an association response (AssocResp). An Access Point (AP) periodically broadcasts a beacon frame at the beginning of each beacon interval (BI), and each station starts the registration procedure after successful reception of the beacon frame. All stations start receiving the beacon frame compete for a CSMA/CA channel to send authentication requests (AuthReqs) to the AP.

The IEEE 802.11ah standard introduced a Centralized Authentication Control (CAC) method which is an authentication mechanism to mitigate severe contention during the initialization of centralized and distributed networks.

In the CAC method, the AP dynamically adjusts an Authentication Control Threshold (ACT) value ($V_{ACT}$), which is included in every beacon frame to keep the number of requesting IoT devices at an optimum level. The AP adjusts $V_{ACT}$ according to the length of the management queue (MQ) that buffers the response frames, such as AuthResp and AssocResp. A larger $V_{ACT}$ allows more stations to send an authentication request frame (AuthReq). Incrementing or decrementing $V_{ACT}$ is decided upon after comparing the current MQ size $Q_L$ with a fixed value for the queue size threshold $Q_T$. If $Q_L$ is greater than $Q_T$, the AP considers a network congested and decreases $V_{ACT}$. On the other hand, if $Q_L$ is less than $Q_T$, the AP considers the network underload and increase $V_{ACT}$. However, the CAC method in IEEE 082.11 ah does not define the procedure to select optimal values for the MQ size $Q_L$, ACT value $V_{ACT}$, and the increment/decrement step size ($\Delta$).

The AP continues sending an updated $V_{ACT}$ in subsequent beacons and regulates the number of contending devices by adaptive adjustment of $V_{ACT}$. Each station receives a $V_{ACT}$ updated in each BI and compares it with a uniform random number ($U_R$) that is generated in the range [0, 1022] during initialization. If $U_R$ is less than or equal to $V_{ACT}$, the station is allowed to send an AuthReq during the current BI. If $U_R$ is greater than $V_{ACT}$, the station is not allowed to access the channel until the next BI. The association procedure starts after a successful authentication procedure.

The AP properly controls the number of devices that are able to successfully join during the current BI. For that reason, when the network is small, $V_{ACT}$ may be higher to allow more devices to send an AuthReq to avoid unnecessary delays. On the other hand, in a large network, $V_{ACT}$ may be lower to reduce a contention level in order to limit the number of device requests. Consequently, the AP may dynamically select the optimal value for $V_{ACT}$ depending on the MQ size.

If authentication is successful, each station sends an AssocReq to the AP. The AP receiving the AssocReq assigns an Association Identification (AID) to the station, sends the AssocResp, and completes the registration procedure. Each station may exchanges sensor/actuator data with the AP only after successful completion of the registration handshakes.

Figure 2:
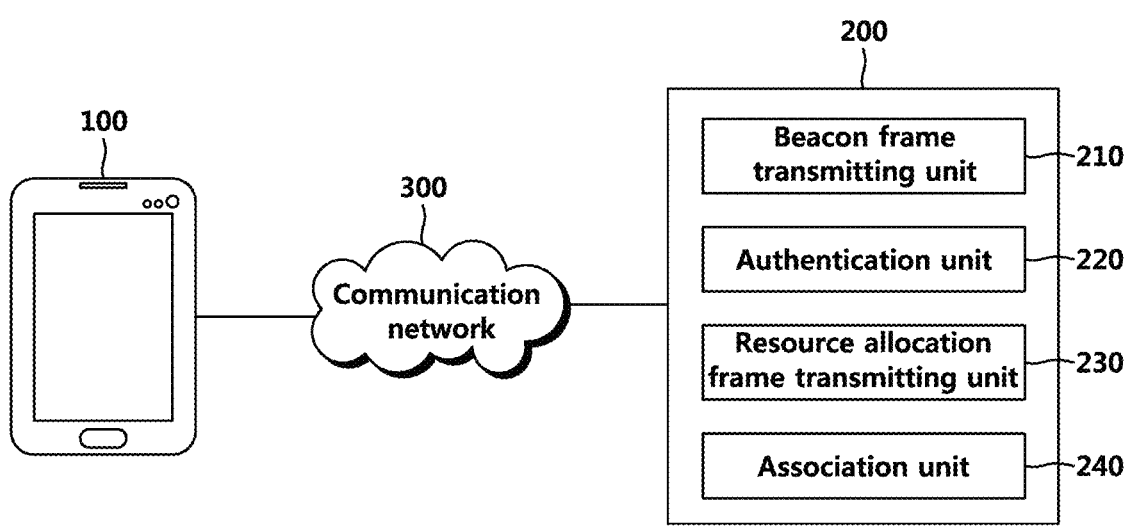
FIG. 2 is a drawing of an embodiment of station authentication system.

FIG. 2 is a drawing of an embodiment of a system for station authentication.

As illustrated in FIG. 2, the system for station authentication includes an IoT station 100, a station authentication apparatus 200, and a communication network 300 connecting the IoT station 100 and the station authentication apparatus 200.

Here, the communication network 300 which is a wireless/wired communication network may be the Internet known as World Wide Web, Intranet and network and/or cellular phone network, and wireless network such as, wireless LAN and/or Metropolitan Area Network.

The station authentication apparatus 200 includes a beacon frame transmitting unit 210, an authentication unit 220, a resource allocation frame transmitting unit 230, and an association unit 240.

The beacon frame transmitting unit 210 broadcasts a beacon frame to the neighboring station 100.

The beacon frame according to an embodiment includes information on a slotted Carrier Sense Multiple Access (CSMA) (slotted-CSMA) period (such as, the number of C-slots, the duration of each C-slot), information on resource allocation, information on Time Division Multiple Access (TDMA) period (such as, the number of T-slots, the duration of each T-slot), and an Authentication Control Threshold value ($V_{ACT}$).

The beacon frame according to another embodiment may further include a beacon interval, a beacon period, information on MAC addresses for non-registered stations and Association Identifications (AIDs) for registered stations that are allowed to use the T-slots, slotted-CSMA/CA period (SCP), the beginning of the SCP, the number of total C-slots (num_C_Slots) in the SCP, the duration of each C-slot, slotted-TDMA period (STP), the number of total T-slots, the duration of each T-slot, and so on.

The authentication unit 220 receives identification information based on a subscriber identification module, encryption identification information that encrypts identification information, and an authentication request from the IoT station 100. The authentication request may be conducted via slotted-CSMA/CA.

The authentication unit 220 extracts identification information and encryption identification information from the authentication information received from the station and compares a value of encrypting the extracted identification information and the extracted encryption identification information.

The resource allocation frame transmitting unit 230 transmits a successful authentication frame to the station 100 if the comparison result matches in the authentication unit 220.

A resource allocation frame transmitted by the resource allocation frame transmitting unit 230 includes a MAC header, a frame body, and a Frame Check Sequence (FCS).

If a beacon frame contains information on resource allocation according to another embodiment, a beacon frame transmitting unit 210 broadcasts the beacon frame to perform resource scheduling. In this case, the station authentication apparatus 200 may not equip itself with the resource allocation frame transmitting unit 230. The information on resource allocation contains the MAC address of a station that is not registered in the beacon frame and information on AID of registered stations.

The association unit 240 transmits an association response frame to a station 100 requesting the association. The transmissions of association request frames and association response frames may be performed in a TDMA manner. Accordingly, request and response may be made sequentially for each of the stations.

Figure 3:
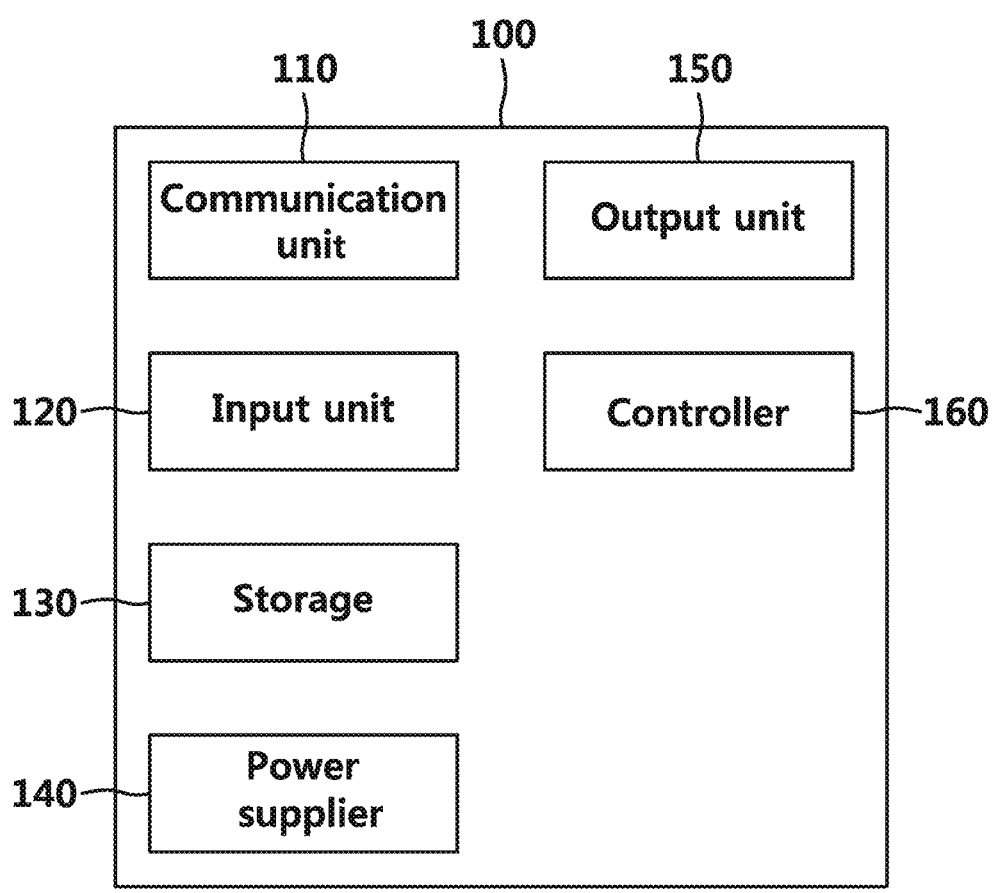
FIG. 3 is a block diagram of an embodiment of a station.

FIG. 3 is a block diagram of an embodiment of a station.

The station 100 according to the embodiment may include a communication unit 110, an input unit 120, a storage 130, a power supplier 140, an output unit 150, and a controller 160, and so on. However, the elements illustrated in FIG. 3 are not essential, and a device having more or fewer elements may be implemented.

The communication unit 110 may include at least one module that enables the wireless communication between a device and a wireless communication system or between a device and a network in which the device is located. For example, the communication unit 110 may include a mobile communication module, a wireless Internet module, a short distance communication module, and a location information module, and so on.

The wireless Internet module refers to a module for wireless Internet access, which may be embedded in a device or externally. As a wireless Internet technique, Wireless LAN (WLAN) such as Wi-Fi, Wireless broadband (Wibro), World Interoperability for Microwave Access (Wimax), High Speed Downlink Packet Access (HSDPA), and so on.

The short range communication module is a module for short range communication. As the short range communication, Bluetooth, Radio Frequency Identification (RFID), Infrared Data Association (IrDA), Ultra Wideband (UWB), ZigBee, Wireless Fidelity (Wi-Fi), and so on.

The input unit 120 generates input data for a user to control operation of the device. The input unit 120 may include a key pad, a dome switch, a touch pad (resistive, capacitive), a jog wheel, a jog switch, and so on.

The storage 130 may store programs for processing and controlling the controller 160 and may have a function for temporarily storing input/output data (for example, message, audio, still image, video, etc.). The storage 130 may also store the frequency of use of each of the data.

The storage 130 may include at least one of a flash memory type, a hard disk type, a multimedia card micro type, a card type memory (e.g., SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

The power supplier 140 receives an external power or internal power by the control of the controller 160 and supplies power necessary for the operations of each element.

The output unit 150 is for generating an output related to visual, auditory, or tactile sense, and it may include a display unit, an audio output module, an alarm unit, a haptic module, a projector module, and so on.

The controller 160 typically controls the overall operation of a device. The controller 160 may include a multimedia module for multimedia playback. The multimedia module may be implemented in the controller 160 or may be implemented separately from the controller 160.

Figure 4:
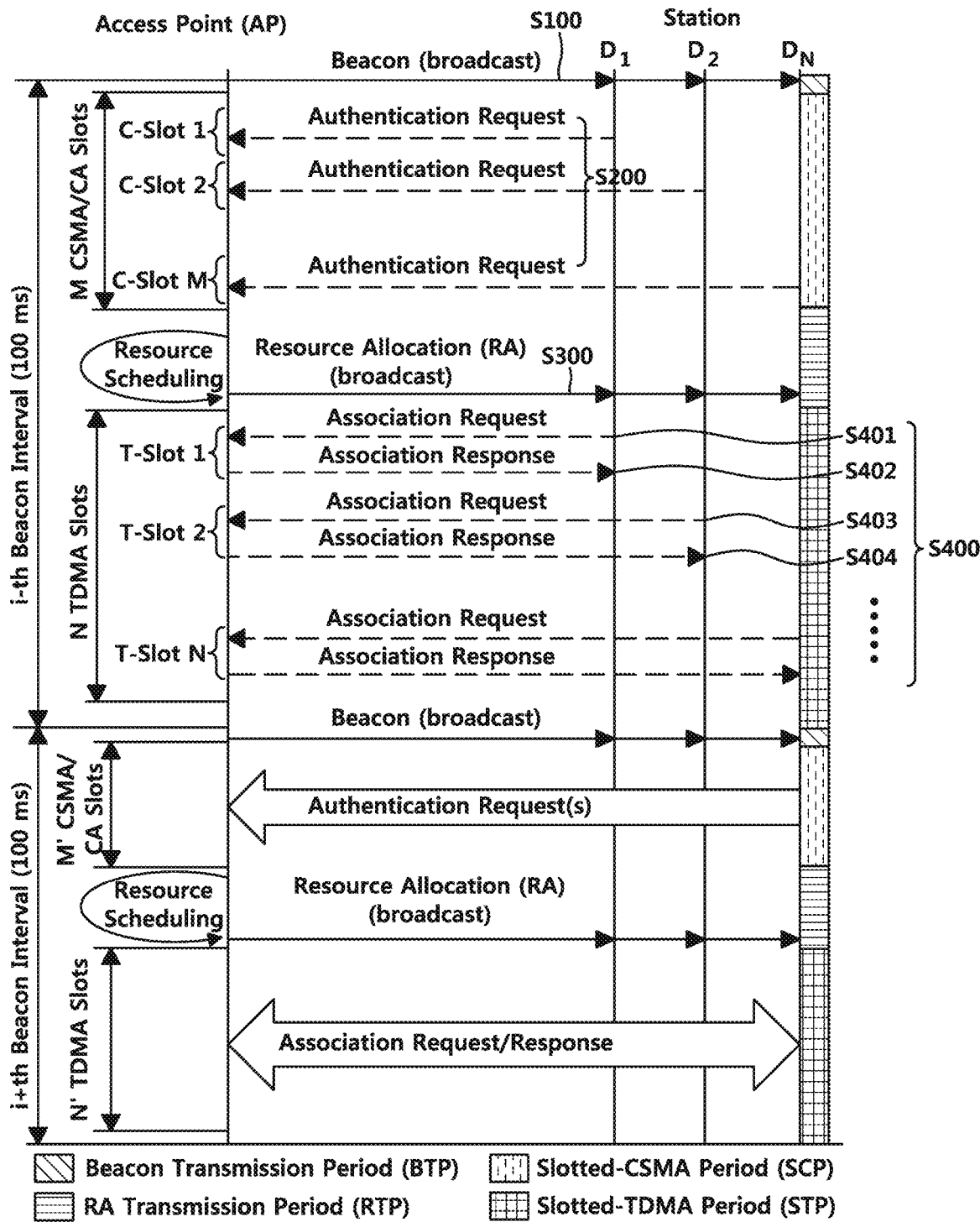
FIG. 4 is a sequence diagram of an embodiment of a method for authentication and association using an apparatus for IoT registration.

FIG. 4 is a sequence diagram of an embodiment of a method for authentication and association using an apparatus for IoT registration.

The method for authentication and association using the apparatus for IoT registration includes: a beacon broadcasting step (S100); an authentication request step (S200); a resource allocation broadcasting step (S300); and an association request and association response step (S400).

As illustrated in FIG. 4, the transmissions of authentication request frames from a station 100 to a station authentication apparatus 200 in the authentication request step S200 use a first method, and the transmissions of association request frames in the association request and association response step S400 use a second method.

In the beacon broadcasting step S100, the station authentication apparatus 200, such as an Access Point (AP), transmits a beacon frame to inform all of the stations 100 within a certain distance that a new beacon interval starts.

In step S100, the station authentication apparatus 200 provides the station 100 with information on slotted-CSMA period (the number of C-slots, duration of a C-slot, and so on), information on resource allocation, information on TDMA period (the number of T-slots, the duration of a T-slot, and so on), information on authentication control threshold value $V_{ACT}$ used in CAC method, and so on.

In the authentication request step S200, the station 100 transmits an authentication request frame to the station authentication apparatus 200 in the first method.

If the first method is a slotted-CSMA/CA, the station 100 receiving a beacon frame generate any number ($U_R$) according to a CAC method. If $U_R$ is less than $V_{ACT}$, the station 100 transmits an authentication request frame using a C-slot.

Each station 100 may transmit the authentication request frame during the slotted-CSMA/CA period (SCP) of each BI. The SCP which is a period allocated to use a slotted-CSMA/CA method includes a plurality of C-slots. Each station 100 that will transmit the authentication request frame follows a backoff process of a CSMA/CA, which is different from the conventional CSMA/CA.

The contention period using the slotted-CSMA/CA scheme is divided into a plurality of mini C-slots. Only one access group can transmit the authentication request frame using a C-slot.

The access group is a group including specific stations 100 whose random number Ur generated according to the CAC method is smaller than $V_{ACT}$.

In step 200, M C-slots are used, and M stations (D1, D2, D3, . . . . Dm) transmit an authentication request frame to the station authentication apparatus 200. The M is a natural number.

The station authentication apparatus 200 does authentication according to a predetermined criterion based on a received authentication request, and if it is authenticated normally, an AID is given to a corresponding station.

In the resource allocation broadcasting step S300, a resource allocation frame is used to inform which T-slot the corresponding station apparatus uses to transmit an association request frame.

An association request frame transmitted in the association request (S401) and association response (S402) of the step S400 is transmitted in a second method.

If the second method is a TDMA, the association request frame conforms to the IEEE 802.11ah standard and is transmitted without a collision via a T-slot determined in the resource allocation frame (S400). A period allocated to use the TDMA method in step S400 is referred to as slotted-TDMA period (STP).

In step S400, N T-slots are used and N stations (D1, D2, D3, . . . , Dn) transmit an authentication request to the station authentication apparatus 200. The N is a natural number and is less than or equal to M.

According to the method for authentication and association using IoT apparatus of one or more embodiments of the present invention, even when a plurality of IoT stations have to simultaneously register, the collision according to the existing CSMA/CA scheme is greatly reduced, thereby increasing bandwidth usage and data transmission efficiency. In addition, the registration time of the entire station may be greatly reduced.

Figure 5:
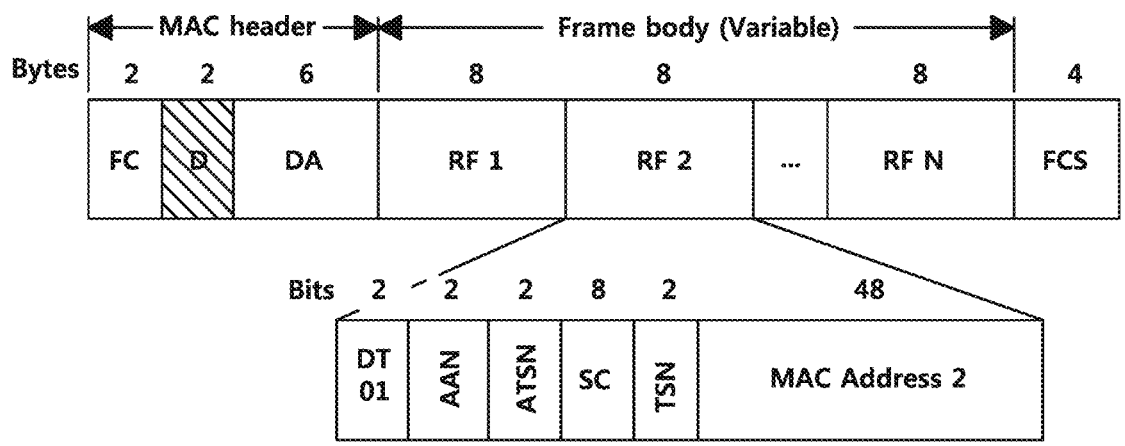
FIG. 5 is a drawing of an embodiment of a structure of a resource allocation frame.

FIG. 5 is a drawing of a structure of an embodiment of a resource allocation frame. The resource allocation frame includes a MAC header, a frame body, and a Frame Check Sequence (FCS) as illustrated in FIG. 5.

The MAC header includes a frame control, a duration, and a destination address. Each of the frame control and the duration is 2 bytes, and the destination address is 6 bytes.

Each registration field includes a T-slot number (TSN) which may be used by a corresponding station 100, a data type, an authentication algorithm number (AAN), an authentication transaction sequence number (ATSN), a status code (SC), a MAC address, and so on.

The frame body may include N registration fields (RFs) corresponding to N stations normally authenticated in step S200, and each of the RFs may be 8 bytes.

The FCS refers to information such as parity or Cyclic Redundancy Check (CRC) that is added for error detection at the end of each frame when information is transmitted for each frame in data communication.

Figure 6:
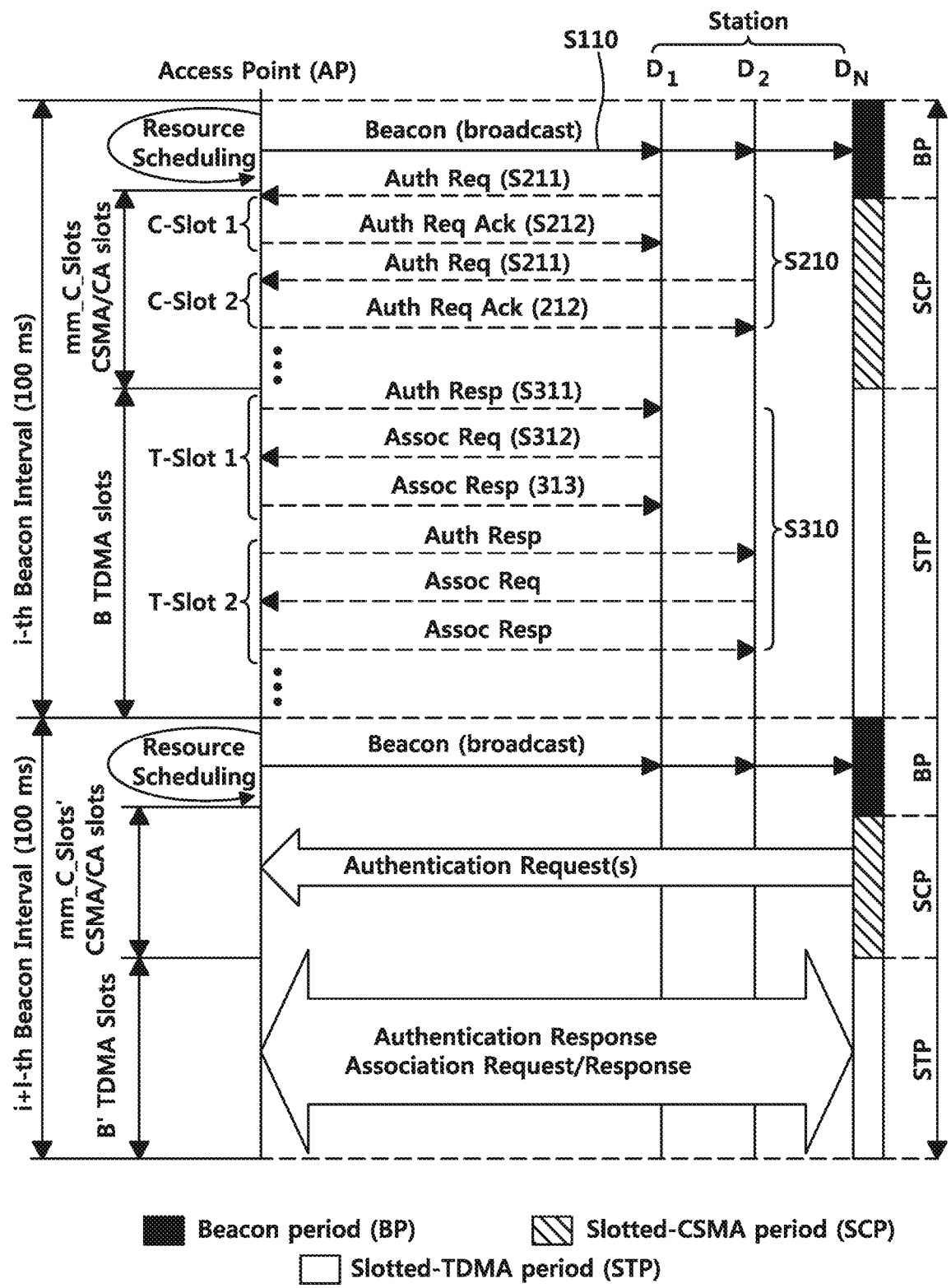
FIG. 6 is a sequence diagram of another embodiment of a method for authentication and association using an apparatus for IoT registration.

FIG. 6 is a sequence diagram of another embodiment of a method for authentication and association using an apparatus for IoT registration.

Referring to FIG. 6, another embodiment of the method includes a beacon broadcasting step (S110), an authentication request step according to a first method (S210), and an authentication request and association response step according to a second method (S310).

In the beacon broadcasting step S110, a station authentication apparatus 200 such as an Access Point (AP) broadcasts a beacon frame during a beacon period (BP) and informs all stations 100 (D$_1$~D$_N$) of the start of a new beacon interval.

The beacon frame includes information on resource allocation. In detail, the beacon frame includes information on a slotted-CSMA/CA period, the beginning of SCP, the number of total C-slots in a SCP (num_C_Slots), a time duration of a C-slot, a beacon interval, beacon period, V$_{ACT}$, MAC address of non-registered station, a slotted-TDMA period (STP), the number of total T-slots (B), and a time duration of a T-slot.

In the authentication request step S210, each station 100 transmits an authentication request frame (AuthReq) to the station authentication apparatus 200 (S211). The station authentication apparatus 200 receiving the authentication request frame (AuthReq) transmits an authentication request Ack frame (AuthReqAck) indicating that an authentication request frame (AuthReq) has been received to a corresponding station 100 (S212).

If the first method is a slotted-CSMA/CA, the transmission of the authentication request frame (AuthReq) is performed during the SCP of each Beacon Interval (BI). Each station 100 that will transmit the authentication request frame follows a backoff process of CSMA/CA.

That is different from the existing CSMA/CA.

First, the contention period is divided into a plurality of mini C-slots. Therefore, only one group including specific stations 100 may transmit the authentication request frame (AuthReq) by using a specific C-slot.

Second, the transmission of the authentication request frame (AuthReq) is allowed only during the SCP. Therefore, the stations that are not allowed to access in a current BI may wait until the SCP of the next BI starts, for the transmission of the authentication request frame.

Third, a backoff slot is randomly selected from a contention window in a fixed range where an overall period length is 6, the number of slots is K, which follows a Sift geometric probability distribution within a C-slot.

In detail, each station 100 selects a backoff slot using a Sift geometric probability distribution rather than a uniform geometric probability distribution.

The Sift probability distribution function p$_r$ is a probability of selecting the r$^{th}$ backoff slot and is expressed by Equation 1 below.

$$p_r = \frac{(1-\alpha)^K}{1-\alpha^K} \cdot \alpha^r \,|\, r = 1, \ldots K \quad \text{(Equation 1)}$$

In Equation 1, $\alpha = M^{-1/(K-1)}$ is a distribution parameter, $0 < \alpha < 1$, M is the maximum number of competitors, and K is the total number of backoff slots. The competitor number means the number of station 100 included in an access group.

Last, when the backoff counter becomes zero and an authentication request frame may be transmitted, a corresponding station 100 checks whether a time remaining in the current SCP before transmission meets a predetermined condition. The predetermined condition means that a time for receiving an Ack frame for the authentication request frame, a related distributed inter-frame space (DIFS), a short inter-frame space (SIFS), and a guard time (T$_{GT}$).

Each station 100 extracts the information on V$_{ACT}$, the number of C-slots in a SCP, and the time duration of a C-slot from each beacon frame. The contention caused by the existing CSMA/CA scheme may be mitigated by the following method.

First, a CAC method reduces the number of stations by configuring an access group that allows accessing a channel using contention-based C-slots.

All stations 100 belong to either (i) an access group, which includes stations 100 that are allowed to send an authentication request frame in the current SCP, or (ii) a deferred group, which includes stations 100 that may wait for the next SCP.

The registration method of the access group according to an embodiment is described in detailed hereinafter. Each station 100 receives a beacon frame and then it extracts V$_{ACT}$ from the beacon frame. Each station 100 generates a uniform random number U$_R$ in the range [0, 1022]. If U$_R \leq$ V$_{ACT}$, a corresponding station 100 belongs to the access group. If U$_R >$ V$_{ACT}$, the corresponding station 100 belong to the deferred group.

In order to reduce the authentication time of a large network, an optimal value for V$_{ACT}$ may be selected. Regarding this, an up and down algorithm in a fast centralized authentication (FCA) provides an efficient performance in an authentication procedure. The above two algorithms select $V_{ACT}$ and increment/decrement step size (Δ) adaptively, based on the management queue size and with the execution of three modes of waiting, studying, and working. In the authentication procedure, the current MQ size ($Q_L$) is obtained from buffers of authentication response frames (AuthResp) at the station authentication apparatus 200.

However, in the registration procedure, the current MQ size $Q_L$ is obtained from the buffers of both response frames (AuthResp, AssocResp). Since the traffic includes not only the response frames but also both request frames (AuthReq, AssocReq), the optimal selection of $V_{ACT}$ and Δ may consider overall traffic. For this, smart-up and smart-down algorithms, which extend the up and down algorithms, are described in detail in the below. The parameters used for each algorithm is indicated in Table 1 below.

TABLE 1

| Parameters | Description |
|---|---|
| maxACT | maximum value of an authentication control threshold value |
| $V_{ACT}$ | authentication control threshold value |
| init_stage | flag for determining whether to initialize $V_{ACT}$ to find more optimal Δ |
| Δ | step size for incrementing or decreasing $V_{ACT}$ |
| $Q_L$ | management queue size of AP |
| $S_A$ | number of successful AuthReq/AssocReq handshakes in the previous BI |
| mode | Variable to distinguish modes (waiting/studying/working) |
| change_Δ | flag that is used to set more precise Δ |
| $V_{ACT\_old}$ | previous authentication control threshold value |

In Table 1, only $V_{ACT\_old}$ is used in the smart-down algorithm, and the other parameters are used in both smart-up and smart-down algorithms.

Both smart-up and smart-down algorithms have the same three modes (waiting, studying, and working) as the up and down algorithms; however, the working principal is different.

Both smart-up and smart-down algorithms have the same waiting mode, and the station authentication apparatus 200 initially executes in waiting mode.

If $Q_L$ is empty, $V_{ACT}$ is set to its maximum value in up and down algorithm, whereas the stations authentication apparatus 200 sets $V_{ACT}$ to the half of its maximum value. This value is assigned only during initialization of waiting mode, and it reduces a convergence time to switch from waiting mode to studying mode.

If $Q_L$ is nonempty, the station authentication apparatus 200 changes its state to studying mode and initializes the parameters $V_{ACT}$ and Δ.

For smart-up algorithm, in studying mode, the station authentication apparatus 200 increases $V_{ACT}$ and Δ based on both the management queue size $Q_L$ and the number of successful AuthReq/AssocReq in the previous BI ($S_A$) to find an optimal Δ in order to register as many stations as possible in each BI. The number of handshakes ($S_A$) refers to the number of successful registration procedures.

The smart-up algorithm initializes $V_{ACT}$ and Δ to 1. In studying mode, if the management queue is empty ($Q_L$==0) and there was no AuthReq/AssocReq handshake in the previous BI ($S_A$==0), then the station authentication request 200 considers the current Δ to be too low, and therefore, Δ is set doubled, which means that there is no station 100 performing successfully the registration procedure, so it is for incrementing the number of stations 100 belong to an Access group by increasing the $V_{ACT}$ On the other hand, if $Q_L$ is empty ($Q_L$==0) but $S_A$ is nonzero, then the station authentication apparatus 200 increases Δ by 1 as in normal mode. Although the queue is empty, however, devices can send AuthReq/AssoReq frames using the current Δ. In this case, if $Q_L$ is nonempty, the station authentication apparatus 200 switches to working mode. In working mode, Δ is only updated if $Q_L$ is empty. Moreover, if flag change_Δ==1 and $S_A$ is zero, then Δ is increased by 2; otherwise, it is increased by 1.

Hereinafter, the operations of each mode of the smart-up algorithm are described in detail.

Each parameter value is set at the initialization of the smart-up algorithm.

In detail, maxACT is set to 1023, $V_{ACT}$ is set to 0, init_stage is set to 1, Δ is set to 0, change_Δ is set to 0, and mode is set to waiting mode.

In BI, the station authentication apparatus 200 checks $Q_L$ and $S_A$, checks as to whether the mode is waiting mode, studying mode, or working mode, and executes a corresponding mode.

At the initialization, the mode is set as waiting mode, so the station authentication apparatus 200 executes waiting mode for the first time.

In waiting mode (waiting_mode),
1. If $Q_L$ is 0,
   ① if init_stage is 1, set $V_{ACT}$ to 0.5×maxACT and then set init_stage to 0.
   ② if init_stage is 0, set $V_{ACT}$ to 1023.
2. If $Q_L$ is not 0,
   set the mode to studying mode, set $V_{ACT}$ to 1, and set Δ to 1.

In studying mode (studying_mode),
1. If $Q_L$ is 0,
   ① If $S_A$ is 0, set Δ to 2Δ, and then, set $V_{ACT}$ to $V_{ACT}$+Δ
   ② If $S_A$ is not 0, set Δ to Δ+1, and then, set $V_{ACT}$ to $V_{ACT}$+Δ
   ③ The set $V_{ACT}$ is greater than or less than maxACT, terminate studying mode and execute waiting mode (waiting_mode)
2. If $Q_L$ is not 0,
   If Δ is greater than 1, set Δ to Δ/2, and then, set change_Δ to 1 and set mode to working mode.

In working mode (working_mode),
1. If $Q_L$ is 0,
   ① If change_Δ is 1 and $S_A$ is 0, set Δ to Δ+2, and then, set $V_{ACT}$ to $V_{ACT}$+Δ
   ② If change_Δ is 1 and $S_A$ is not 0 or if change_Δ is 0 and $S_A$ is 0, set Δ to Δ+1, and then, set $V_{ACT}$ to $V_{ACT}$+Δ
   ③ If the set $V_{ACT}$ is greater than or less than maxACT, terminate working mode (working_mode) and execute waiting mode (waiting_mode)
2. If $Q_L$ is not 0, set change_Δ to 0

In smart-down algorithm, the station authentication apparatus 200 sets an authentication control threshold value $V_{ACT}$ to the half of its maximum value (maxACT) if $Q_L$ is 0. If $Q_L$ is not 0, a previous authentication control threshold value $V_{ACT\_old}$ is set to the authentication control threshold value $V_{ACT}$ and the authentication control threshold value $V_{ACT}$ is set to 0 at initialization of the studying mode. In this mode, if $Q_L$ is not 0 or $S_A$ is not 0, the authentication control threshold value $V_{ACT}$ is set to a half of the previous authentication control threshold value $V_{ACT\_old}$ and the previous authentication control threshold value $V_{ACT\_old}$ is set to a current authentication control threshold value $V_{ACT}$ in order to reduce traffic.

Meanwhile, if $Q_L$ is 0 and $S_A$ is 0, Δ is set to $V_{ACT}$ and $V_{ACT}$ is updated to $V_{ACT}$+Δ, and then, the station authentication apparatus 200 is switched to working mode and parameters are updated according to working mode.

The operation of smart-down algorithm is described in detail.

In case of the smart-down algorithm, its initialization is performed same as the initialization of the smart-up algorithm, and additionally, $V_{ACT\_old}$ is set to 0. In BI, the station authentication apparatus 200 checks $Q_L$ and $S_A$, and checks as to whether the mode is waiting mode, studying mode, or working mode, and executes a corresponding mode. At the initialization, mode is set to waiting mode, so the station authentication apparatus 200 executes the waiting mode first.

In waiting mode (waiting_mode),
1. If $Q_L$ is 0,
① if init_stage is 1, set $V_{ACT}$ to 0.5×maxACT and then set init_stage to 0.
② if init_stage is 0, set $V_{ACT}$ to 1023.
2. If $Q_L$ is not 0,
set the mode to studying mode, set $V_{ACT}$_old to $V_{ACT}$, and set $V_{ACT}$ to 0.

In studying mode (studying_mode),
1. If $Q_L$ is not 0 or $S_A$ is not 0,
① If $V_{ACT\_old}$ is greater than 1, set $V_{ACT}$ to 0.5×$V_{ACT\_old}$ and then, set $V_{ACT\_old}$ to $V_{ACT}$
② If $V_{ACT}$ is greater than or less than maxACT, terminate studying mode and executes waiting mode
2. If $Q_L$ is 0 and $S_A$ is 0,
① set $\Delta$ to $V_{ACT}$, and set $V_{ACT}$ to $V_{ACT}+\Delta$
② change_$\Delta$ is set to 1, and mode is set to working mode.

The working mode is the same as the working mode in smart-up algorithm.

As described above, one or more embodiments of the present invention greatly reduces an authentication time of a large network having a large background traffic load by selecting an optimal CAC parameter ($V_{ACT}$, $\Delta$) through the modified smart-up, smart-down algorithms.

Meanwhile, each station 100 belonging to the access group selects one C-slot from all CSMA/CA slots defined in a beacon frame. By providing more time for the SCP in a fixed BI, the duration of the STP will be decreased, and the transmission time for successful station 100 is reduced. Thus, there is a tradeoff between the durations of the SCP and the STP in a fixed BI, which is related to channel utilization and described in detail hereinafter.

The station authentication apparatus 200 may provide a sufficient length of time for the SCP that ensures more successful transmissions of AuthReqs, as well as an optimal duration for the STP that successfully executes the remaining handshakes in the registration process. Therefore, if the length of the SCP is inadequate (i.e., it is unable to allow an appropriate number of AuthReqs that is less than the number of T-slots in the STP), then some T-slots may be unused, and there may be some waste. On the other hand, increasing the duration of the SCP allows the number of AuthReqs to exceed the number of T-slots in the STP; then, after allocating all T-slots in the current SCP, the remaining stations 100 may wait for the next BI. This reduces the number of T-slots, and therefore, channel utilization is decreased in the registration process.

The efficient resource utilization may be obtained under the following condition:

The station authentication apparatus 200 maintains an equal number of authentication requests and T-slots. That is, the number of successful authentication requests in the SCP is equal to the number of T-slots in the STP within a BI.

There may be more requests than T-slots in a BI. In this case, the authentication requests in the previous BI may have higher priority than the authentication requests in the current BI.

The adaptive adjustment procedure of the SCP and STP under the above-mentioned conditions is described in detail below.

The station authentication apparatus 200 recognizes the number of total authentication requests $R_{total}$.

1. If $R_{total}$ is 0,
The station authentication apparatus 200 sets the length of the current SCP $D_{SCP\_curr}$ to the half of the length of beacon interval $T_{BI}$.

2. If $R_{total}$ is not 0,
1) If the number of total authentication requests in the previous BI ($R_{total\_prev}$) is greater than the number of T-slots (B), the length of the current SCP ($D_{SCP\_curr}$) is set to the value obtained by subtracting a predetermined value from the length of a previous SCP ($D_{SCP\_prev}$). That is for keeping a balance by reducing the length of the SCP because there are more authentication requests than the number of T-slots (B), that is, the SCP is greater than the STP. The predetermined value is a value capable of keeping a balance between the SCP and the STP so as to maximize channel utilization and that may be experimentally set or changed.

2) If the number of total authentication requests in a previous BI ($R_{total\_prev}$) is less than the number of T-slots, the length of the current SCP ($D_{SCP\_curr}$) is set to a value obtained by adding a predetermined value to the length of a previous SCP ($D_{SCP\_prev}$). In this case, the number of authentication requests is less than the number of T-slots (B). The balance may be obtained by increasing the length of the SCP.

3) If the number of total authentication requests in the previous BI ($R_{total\_prev}$) is equal to the number of T-slots, the length of the current SCP ($D_{SCP\_curr}$) is set to the same as the length of the previous SCP ($D_{SCP\_prev}$). Since the balance between SCP and STP is maintained, the length of the SCP does not have to be adjusted.

As described above, the channel may be efficiently utilized by maintaining a balance between the SCP and the STP via the adaptive adjustment procedure.

In the authentication request and association response step (S310), the station authentication apparatus 200 transmits an authentication response frame (AuthResp) to the corresponding station 100 transmitting an authentication request Ack frame (AuthReqAck). A station 100 receiving the authentication response frame (AuthResp) transmits an association request frame (AssocReq) to the station authentication apparatus 200. The station authentication apparatus 200 receiving the association request frame (AssocReq) assigns an Association Identification (AID) to the corresponding station 100 and then transmits an association response frame (AssocResp) (S313).

In order for the contention in registration procedure of IoT apparatus to be minimized, the second method may be TDMA.

The method that a station 100 accesses a T-slot according to TDMA is described in detail below.

After the station authentication apparatus 200 replies with an authentication request Ack frame (AuthReqAck) after successful reception of an authentication request frame (AuthReq). The authentication request Ack frame (AuthReqAck) is different from a traditional authentication request Ack frame in that T-slot information, such as a T-slot index, is included. Therefore, stations 100 forward the authentication request Ack frame (AuthReqAck) from a MAC low layer to a MAC high layer to extract the T-slot information at the stations. Moreover, the authentication request Ack frame (AuthReqAck) prevents the stations 100 from retransmitting the authentication request frame (AuthReq) in the current SCP.

Before providing T-slot information, the station authentication apparatus 200 checks whether T-slots are available or not. If a T-slot is available, the T-slot index is (TSN) is included; otherwise, the station authentication apparatus 200 sends a "no free T-slot" status flag that acknowledges successful reception of the authentication request frame (AuthReq) with no available T-slot from the station authentication apparatus.

The status flag tells the station 100 to wait for the STP in the next BI. On the other hand, if the total number of authentication request frames (AuthReq) in the current and previous logical frames is more than B, which is the number of T-slots, the station authentication apparatus queues the authentication request frames (AuthReqs) in the buffers and addresses them in first-in-first-out (FIFO) order in the subsequence BI. Upon receiving the authentication request Ack frame (AuthReqAck) from the AP, the station 100 will stop sending the AuthReq and will wait for an allocated T-slot. However, if the station 100 does not receive an AuthReqAck within the AuthReqAck timeout limit, the station 100 resends the AuthReq through the current C-slot.

If the station 100 verifies its MAC address in an RI field (RIF), the device will get a TDMA slot number (TSN) in which to exchange the remaining frames in the assigned T-slot. The total number N of RIFs is a natural number greater than or equal to 2 and is less than or equal to B, the total number of T-slots.

The STP is divided into B T-slots with a fixed duration, where each T-slot allows the exchange of AuthResp/AssocReq/AssocResp with ACK frames. Thus, the station authentication apparatus 200 replies with AuthResp following a SIFS.

A station 100 to which a T-slot is successfully assigned turns on a radio channel in its assigned T-slot to receive the authentication response frame (AuthResp) and sends the association request frame (AssocReq) to the station authentication apparatus 200 using its allocated T-slot. The station 100 may turn its radio channel off at all other times to save energy except for the T-slot. Through the specified T-slot, the station authentication apparatus 200 receives an association request frame (AssocReq) without collision and replies with an association response frame (AssocResp) that provides capabilities information, AID, and supported rates, which is necessary information for the station 100. In case of hidden stations and high noise in the channel, however, the station authentication apparatus 200 or the station 100 may fail to deliver one of the frames while participating in registration during the T-slot. Usually, standards designate AuthenticationRequestTimeout and AssociationRequestTimeout for resending an AuthReq and an AssocReq, respectively, after a request timeout has occurred. Therefore, if a station 100 does not successfully receive an authentication response frame (AuthResp) within the timeout limit, the station 100 resends the authentication request frame (AuthReq). In addition, if a station 100 does not successfully receive an association response frame (AssocResp), the station 100 sends a power save poll (PS-poll) request to get the station authentication apparatus 200 to assign a T-slot.

As described above, the first method uses the slotted-CSMA/CA scheme, and the second method uses the TDMA method, which greatly reduces contention occurrence even when many IoT apparatuses register simultaneously, thereby increasing bandwidth utilization and data transmission efficiency.

Figure 7:
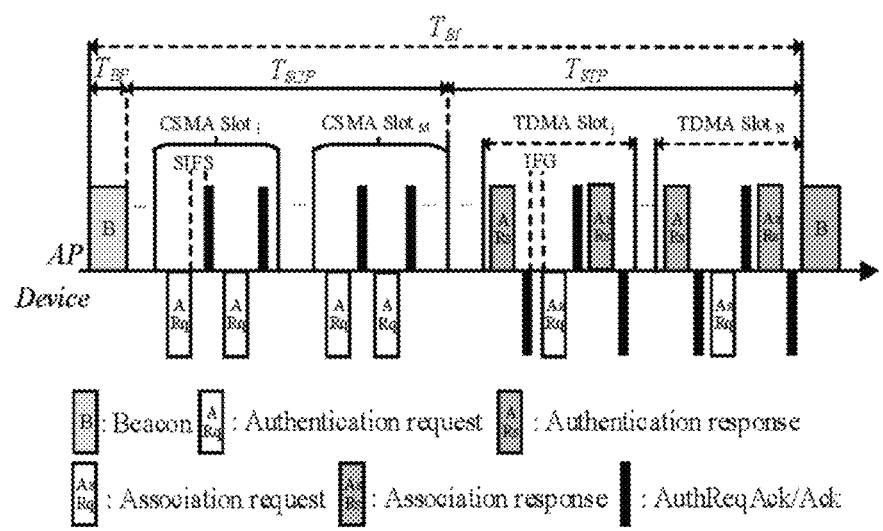
FIG. 7 is a drawing of frames that are transmitted or received in a beacon interval according to another embodiment of a method for authentication and association of an apparatus for IoT registration.

FIG. 7 is a drawing of frames that are transmitted or received in a beacon interval according to another embodiment of a method for authentication and association of an apparatus for IoT registration.

Referring to FIG. 7, transmission time is divided into a constant period beacon interval (BI), denoted by $T_{BI}$, which includes three parts: beacon period (BP), slotted-CSMA/CA period, and slotted-TDMA period, where the durations are denoted by $T_{BP}$, $T_{SCP}$, and $T_{STP}$, respectively.

In $T_{BP}$, a station authentication apparatus 200, such as AP, broadcasts beacon frames. In $T_{SCP}$, an authentication request procedure is performed. Each station 100 belonging to an access group competitively transmits an authentication request frame (ARq) to the station authentication apparatus 200 in one C-slot (one of CSMA Slot i~CSMA Slot M) selected by the apparatus.

The station authentication apparatus 200 receiving the ARq transmits an authentication request Ack frame (AuthReqAck) indicating a successful reception of the ARq to a corresponding station 100 after a Short Inter-Frame Space (SIFS).

In $T_{STP}$, an authentication response and association request/response procedure is performed. The station authentication apparatus 200 transmits authentication response frames (ARs) to each station 100 receiving the authentication request Ack frame (AuthReqAck).

Each station 100 receiving the authentication response frames (ARs) transmits an association request frame (AsRq) to the station authentication apparatus 200 after an Inter-Frame Gap (IFG). Each station 100 does not compete with other stations 100 in making an association request since a T-slot (one of slots of TDMA Slot$_j$~TDMA Slot$_N$) is allocated to a corresponding station 100.

The station authentication apparatus 200 receiving the association request frame (AsRq) transmits an association request Ack frame to a corresponding station 100 indicating successful reception of the AsRq.

The transmission of the association response frame (AsRs) by the station authentication apparatus 200 completes the registration procedure.

After the registration procedure, unique Association Identifications (AIDs) are allocated to each station completing the registration procedure. Each of the registered stations 100 is identified by its MAC address and a unique AID.

Figure 8:
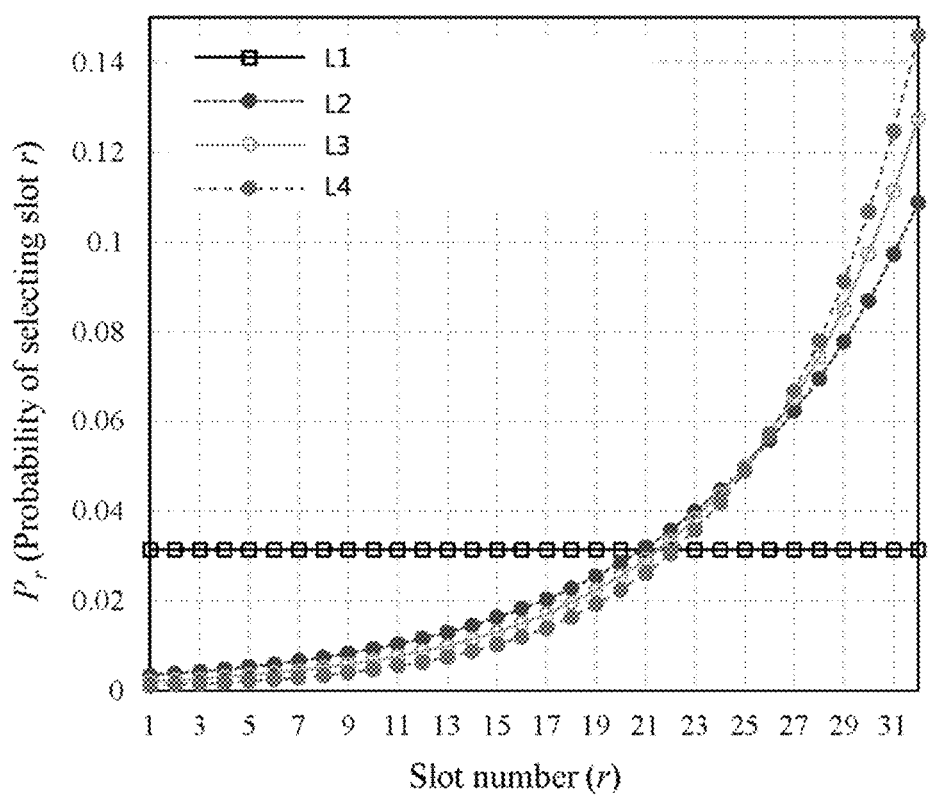
FIG. 8 is a graph related to the slot number and the probability of selecting a backoff slot that compares another embodiment of the present invention and related arts.

FIG. 8 is a graph related to the slot number and the probability of selecting a backoff slot that compares another embodiment of the present invention and related arts.

FIG. 8 is a graph illustrating probabilities of selecting backoff slot (r) for the case of uniform geometric probability distribution according to IEEE 802.11ah (L1) and the cases of Sift geometric probability distribution (L2 to L3). The number K of total backoff slots is 32. In L2 to L4, the maximum contender number M is different from each other, which is 32 for L2, 64 for L3, and 128 for L4.

Referring to FIG. 8, L1 shows a uniform probability for any backoff slot. In the cases of L2 to L4, although there is a slight difference degree, the probability of selecting backoff slots from the front is lower than the probability of selecting backoff slots from the end, and as the number of a backoff slot increases, the probability of selecting the backoff slot also increases.

When selecting a backoff slot using the Sift geometric probability distribution according to one or more embodiments of the present invention, if each of a plurality of stations 100 in IoT network simultaneously tries to access a C-slot, only a few stations 100 select the front backoff slots and the others select latterly positioned slots. Therefore, the probability of collision in the front backoff slots is reduced, and the more successful transmissions are possible compared to the case of using a uniform geometric probability distribution.

Figure 9:
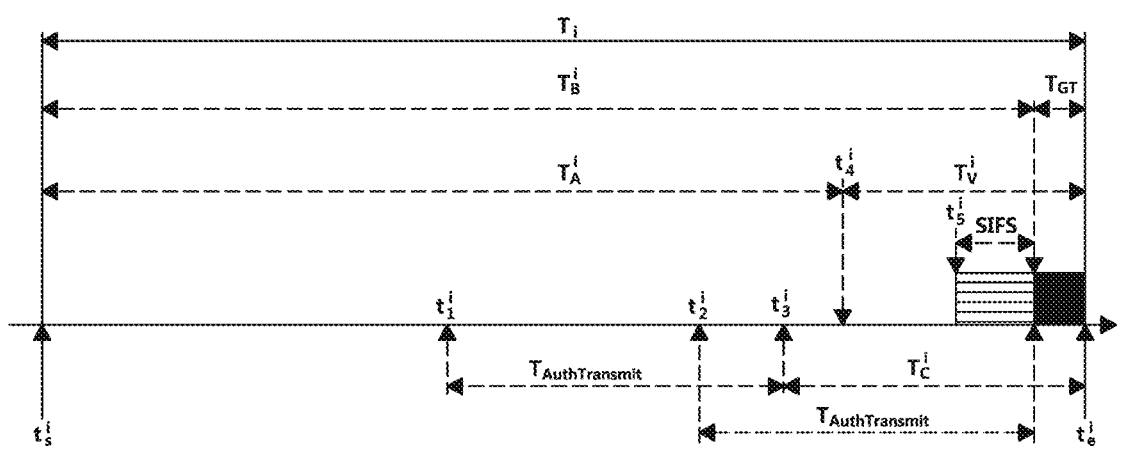
FIG. 9 is a drawing for explaining the structure of a slotted-CSMA mechanism according to another embodiment.

FIG. 9 is a drawing for explaining the structure of a slotted-CSMA mechanism according to another embodiment.

Referring to FIG. 9, SCP includes a plurality of C-slots. $T_i$ refers to i-th C-slot period of the plurality of C-slots. $T_i$ is divided into $T_B^i$ and $T_{GT}$. $T_{GT}$ is a guard time, which means an empty time interval (that is, data is not transmitted) in a transmission channel to be used for synchronization or compensating signal distortion. $T_B^i$ means a backoff period. $T_i$, which is C-slot period, starts from $t_s^i$ and ends at $t_e^i$. Each station 100 performs backoff within the backoff period interval $T_B^i(=T-T_{GT})$.

$T_B^i$ is divided into an access period $T_A^i$ and a vulnerable period $T_V^i$. A station 100 that belongs to an access group checks whether the whole duration of an authentication request frame exchange including an authentication request ACK frame will be completed before $t_5^i(=t_e^i-SIFS-T_{GT})$.

If the authentication request exchange is not completed before $t_5^i$, the frame transmission may incur a conflict with the next C-slot or T-slot. Therefore, after an acceptable transmission attempt, the remaining time may have to be greater than the conflict period $[T_C^i=T_{AuthReq}+T_{AuthReqAck}+2SIFS+T_{GT}]$, where $T_{AuthReq}$ is the time to transmit one authentication request frame (AuthReq), $T_{AuthReqAck}$ is the time to receive the acknowledgment (ACK) for a transmitted AuthReq, that is, the time to receive an authentication request ACK frame, the SIFS is the short inter-frame space before receiving the ACK.

If a backoff counter reaches zero within the conflict period, the conflict is resolved by performing a strategy where stations 100 invoke another stage of the backoff procedure.

If the transmission of an authentication request frame is initiated within the interval between $t_1^i$ and $t_2^i$, the AuthReq is transmitted either successfully or with a collision, according to the CSMA/CA mechanism. The $T_{AuthTransmit}$ of FIG. 9 denotes $T_{AuthTransmit}=DIFS+T_{AuthReq}+SIFS+T_{AuthReqAck}$.

The packet transmission according to a slotted-CSMA/CA mechanism is executed within the interval $[t_s^i, t_e^i]$, and there may be an ineffective interval $T_V^i$, vulnerable period, between the last AuthReq transmission finishing point $t_4^i$ and the end of the i-th C-slot, $t_e^i$.

If an authentication request frame (AuthReq) transmission attempt is suspended in a current C-slot of the SCP, a new AuthReq is initiated, and the backoff slot is reset in the next SCP after making a virtual grouping. Other stations that are not involved in the conflict period pause their backoff counters at the starting point of the backoff period $(t_B^i)$.

When a station 100 is busy (in backoff stage or in transmission), the transmission probability T for each station 100 in any time slot is expressed by Equation 2.

$$\tau = \frac{E[C]}{E[B]+E[C]} \quad \text{(Equation 2)}$$

In Equation 2, E[B] denotes an expected number of backoff slots, and E[C] denotes the number of transmission trials experienced by one AuthReq frame.

The transmission probability (τ) may be approximated based on renewal reward theory as a ratio of the average reward received during a renewal cycle over the average length of the renewal cycle. Then, E[B] and E[C] are expressed as Equation 3 and Equation 4, respectively.

$$E[B]=\Sigma_{s=1}^{S}(E[b_s]) \cdot P_{fc}^{s-1} \quad \text{(Equation 3)}$$

$$E[C]=\Sigma_{s=1}^{S} P_{fc}^{s-1} \quad \text{(Equation 4)}$$

In Equation 3, $E[b_s]$ is the expected number of backoff slots in the s-th backoff stage, and S is the maximum number of backoff stages. If a transmitted authentication request frame (AuthReq) collides with probability $P_{fc}$, the expected number of transmission trials follows a truncated geometric distribution with success probability $(1-P_{fc})$. $E[b_s]$ of Equation 3 may be expressed by Equation 5, following Sift geometric distribution-based probability distribution.

$$E[b_s]=\Sigma_{r=1}^{K} r \cdot p_r \cdot (1-p_r)^{r-1} \quad \text{(Equation 5)}$$

In Equation 5, $p_\tau$ is the Sift probability for selection of backoff slot r. $p_\tau$ is determined using Equation 1, so Equation 2 above may be rewritten as the following Equation 6.

$$\tau = \frac{\Sigma_{S=1}^{S} P_{fc}^{S-1}}{\Sigma_{S=1}^{S}(E[b_s])P_{fc}^{S-1} + \Sigma_{S=1}^{S} P_{fc}^{S-1}} \quad \text{(Equation 6)}$$

In order to calculate an expected duration of the general backoff slot in $T_A^i$, the following three states are considered.

First, the slot may be idle if there is no authentication request frame (AuthReq) transmission by any station 100, with backoff slot duration δ, and the probability may be expressed by Equation 7.

$$a_A^i=(1-\tau)^{N_{ac}} \quad \text{(Equation 7)}$$

In Equation 7, τ is the probability that a station 100 transmits in any time slot defined in Equation 6, and $N_{ac}$ is the number of actual contenders.

Second, the last time instant when the AuthReq transmission attempt is allowed is $t_3^i=(t_e^i-T_C^i)$, and conflict period $T_C^i$ is smaller than the duration of a successful AuthReq transmission frame $(T_{AuthTransmit})$. Since the whole transmission for authentication request frame (AuthReq) has to be finished before $t_5^i$, that is, at least one SIFS plus one guard time $(T_{GT})$ before the end of the i-th C-slot.

If an AuthReq transmission starts in the interval $[t_2^i, t_3^i]$, the AuthReq transmission will continue until the next C-slot or T-slot. Thus, the duration of such a transmission $(T'_{AuthTransmit})$ is less than $T_{AuthTransmit}$. For such a duration, the beginning of the frame transmission is uniformly distributed inside $[t_2^i, t_3^i]$, and an expected duration may be expressed by the following Equation 8.

$$E[T'_{AuthTransmit}] = \frac{T_{AUthTransmit} + T_C^i}{2} \quad \text{(Equation 8)}$$

Since the transmission of the authentication request frame (AuthReq) has to start before the conflict period $T_C^i$, (that is, $T_B^i-T_C^i+T_{GT}$), the T'AuthTransmit may be defined as $$\frac{T_{AuthTransmit} + T_C^i}{T_B^i - T_C^i + T_{GT}},$$

and the probability of the restricted slot (slots in the interval $[t_2^i, t_3^i]$) is expressed by the following Equation 9

$$b_A^i = (1 - a_A^i) \cdot \frac{T_{AuthTransmit} + T_C^i}{T_B^i - T_C^i + T_{GT}} \quad \text{(Equation 9)}$$

Third, the backoff slots may be contained in an authentication request frame (AuthReq) transmission as either successful or collided. Therefore, the probability of a successful/collided slot is expressed by Equation 10.

$$c_A^i = 1 - a_A^i - b_A^i \quad \text{(Equation 10)}$$

Let $D_A^i$ be the duration of a generic slot inside $T_A^i$. The expected duration of a generic slot within access period is expressed by the following Equation 11.

$$E[D_A^i] = a_A^i \cdot \delta + b_A^i \cdot T'_{AuthTransmit} + c_A^i \cdot T_{AuthTransmit} \quad \text{(Equation 11)}$$

where $a_A^i$ is the probability that a backoff slot is idle, $b_A^i$ is the probability that transmission is not completed due to lack of transmission time (that is, the probability of transmitting in only $T'_{AuthTransmit}$), $c_A^i$ is the probability that the transmission of an authentication request frame (AuthReq) is completed (successful transmission/collision), and 6 is the duration of a contention window.

If the last AuthReq transmission is initiated within time interval $[t_1^i, t_3^i]$, such a transmission ends at point $t_4^i(t_e^i - T_V^i)$, which is positioned in conflict period $T_C^i$, where vulnerable period $T_V^i$ is shorter than the conflict period $T_C^i$, on average. In this case, it is estimated that the starting point of the transmission is uniformly distributed inside $[t_1^i, t_3^i]$, with expected vulnerable period $$T_V^i = \frac{T_C^i}{2}.$$

However, if there is no transmission within the interval $[t_1^i, t_3^i]$, then $T_V^i = T_C^i$.

The number of idle backoff slots in $[t_1^i, t_3^i]$ may be defined by the following Equation 12.

$$\Gamma_{T_{AuthTransmit}} = \frac{T_{AuthTransmit}}{\delta} \quad \text{(Equation 12)}$$

The probability of no transmission in the interval $[t_1^i, t_3^i]$ is $$a_A^{i\Gamma_{T_{AuthTransmit}}}.$$

Thus, the expected length of $T_V^i$ may be expressed by the following Equation 13.

$$E[T_A^i] = a_A^{i\Gamma_{T_{AuthTransmit}}} \cdot T_C^i + \left(1 - a_A^{i\Gamma_{T_{AuthTransmit}}}\right) \cdot \frac{T_C^i}{2} = \quad \text{(Equation 13)}$$

$$\left(1 + a_A^{i\Gamma_{T_{AuthTransmit}}}\right) \cdot \frac{T_C^i}{2}$$

The expected length of the access period within a C-slot may be obtained with $E[T_A^i] = T_i - T_V^i$, referring to FIG. 9, and the expected number of authentication request frames (AuthReqs) in a C-slot may be derived from the following Equation 14.

$$E[\Gamma_A^i] = \frac{E[T_A^i]}{E[D_A^i]} \quad \text{(Equation 14)}$$

In order to find out the number of expected transmission slots within a $T_A^i$, solutions for two unknowns, $\tau$ and P, are obtained using Equation 14. $\tau$ is a probability for the transmission of a station 100. Collision probability obtained as follows since the collision may only occur if any other station 100 also transmits in the same time slot outside the vulnerable period (or conflict period). Since the probability of transmitting for each node is $\tau$, the collision probability may be written by the following Equation 15.

$$P = 1 - (1-h)(1-\tau)^{N_{ac}-1} \quad \text{(Equation 15)}$$

where h is the probability for a generic slot to be in the vulnerable time, and it may be obtained by the following Equation 16.

$$h = \frac{\Gamma_V}{\Gamma_A + \Gamma_V} \quad \text{(Equation 16)}$$

In Equation 16, the average number of slots, $\Gamma_V$, within a vulnerable period may be estimated as $$\Gamma_V = \frac{T_V}{\delta},$$

with $\Gamma_V$ already defined in Equation 14. Therefore, the expected number of AuthReqs in one SCP may be derived as the following Equation 17.

$$E[\Gamma_{SCP}] = [E[\Gamma_A^i]] \cdot \text{num\_C\_Slots} \quad \text{(Equation 17)}$$

where num_C_Slots is the total number of C-slots, and the duration of all the C-slots is the same.

Figure 10:
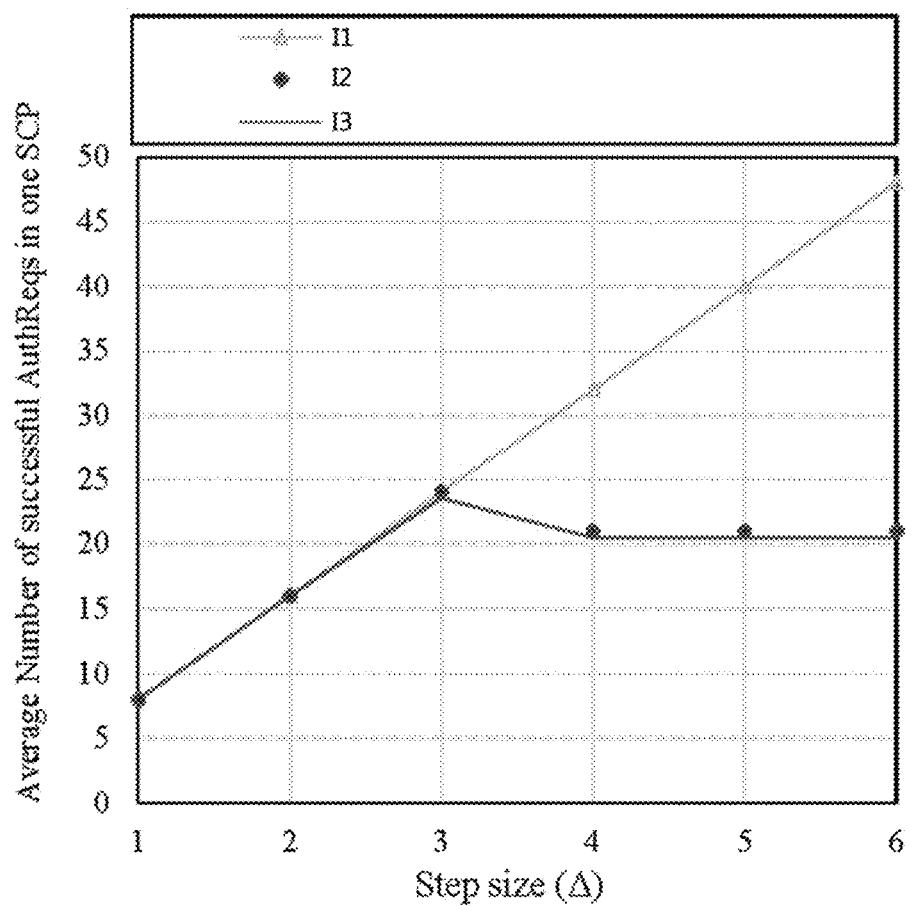
FIG. 10 is a graph that compares average number of AuthReqs in one slotted-CSMA/CA period (SCP) according to another embodiment of the present invention.

FIG. 10 is a graph that compares average number of AuthReqs in one slotted-CSMA/CA period (SCP) according to another embodiment of the present invention.

Referring to FIG. 10, the average number of successful AuthReqs in one SCP ($A_{avg}$) and the actual number of contenders ($N_{ac}$) with a different step size ($\Delta$) for a Sift geometric probability is plotted in FIG. 6.

The step size provides the actual number of contenders ($N_{ac}$) among the N stations defined as the following Equation 18.

$$N_{ac} = \frac{\Delta}{N} 1023 \quad \text{(Equation 18)}$$

The average number of successful authentication request frames (AuthReqs) in one SCP ($A_{avg}$) is obtained provided that the number of contenders $N_{ac}$ depending on a selected step size $\Delta$ is provided using Equation 18.

In FIG. 10, I1 refers to the actual number of contenders ($N_{ac}$), I2 refers to the average number of analytical results for successful AuthReq ($A_{avg}$), and I3 refers to the average number of simulation results for successful AuthReqs ($A_{avg}$).

I2 and I3 tend to coincide, and the number of contenders ($N_{ac}$), and the number of contenders ($N_{ac}$) and the average number of successful AuthReq ($A_{avg}$) are the equal to each other until the step size ($\Delta$) reaches 3, but thereafter, $A_{avg}$ becomes smaller than $N_{ac}$. The optimal step size $\Delta_{opt}$, which allows the authentication request frame to be successfully transmitted over the $N_{ac}$, is 3. That is, the authentication request procedure may be efficiently performed when num_C_Slots, the total number of C-slots in one SCP, is 3.

Figure 11:
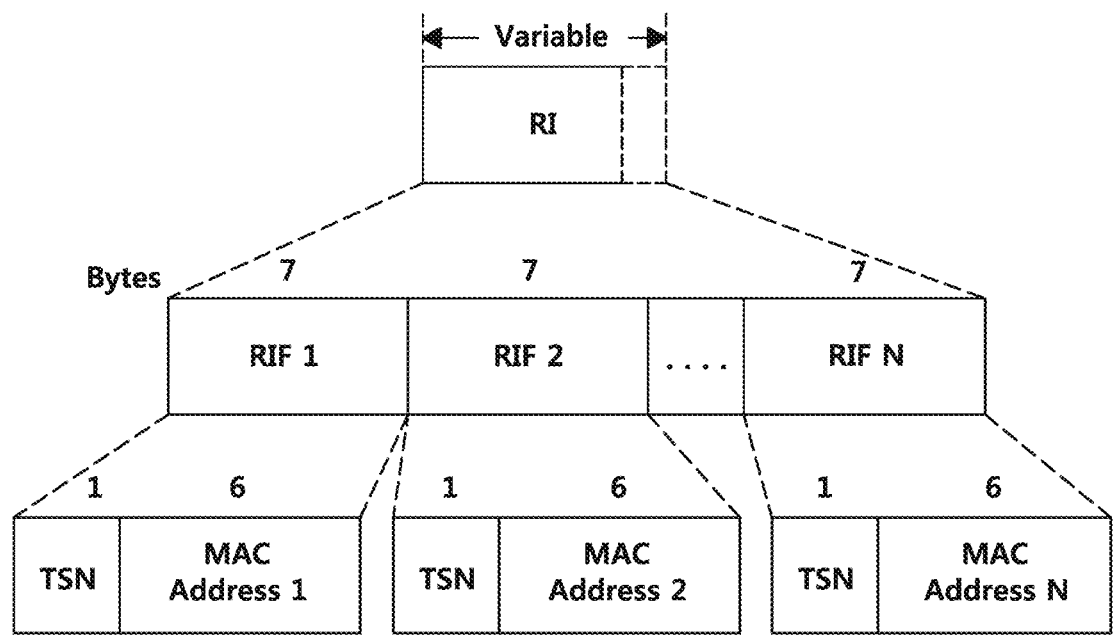
FIG. 11 is a drawing of the format of a Registration Information (RI) field included in a beacon frame according to another embodiment.

FIG. 11 is a drawing of the format of a Registration Information (RI) field included in a beacon frame according to another embodiment.

Referring to FIG. 11, a beacon frame includes a RI block that includes N RI fields (RIFs), where N is a natural number. The RIFs (RIF 1~RIF N) include information on MAC address (MAC address 1~MAC address N) of a registered station 100 and a TDMA Slot Number (TSN) assigned to the station 100. The size of RIF may be 7 bytes, and in this case, TSN may be 1 byte, and MAC address of the station 100 is 6 bytes.

Figure 12:
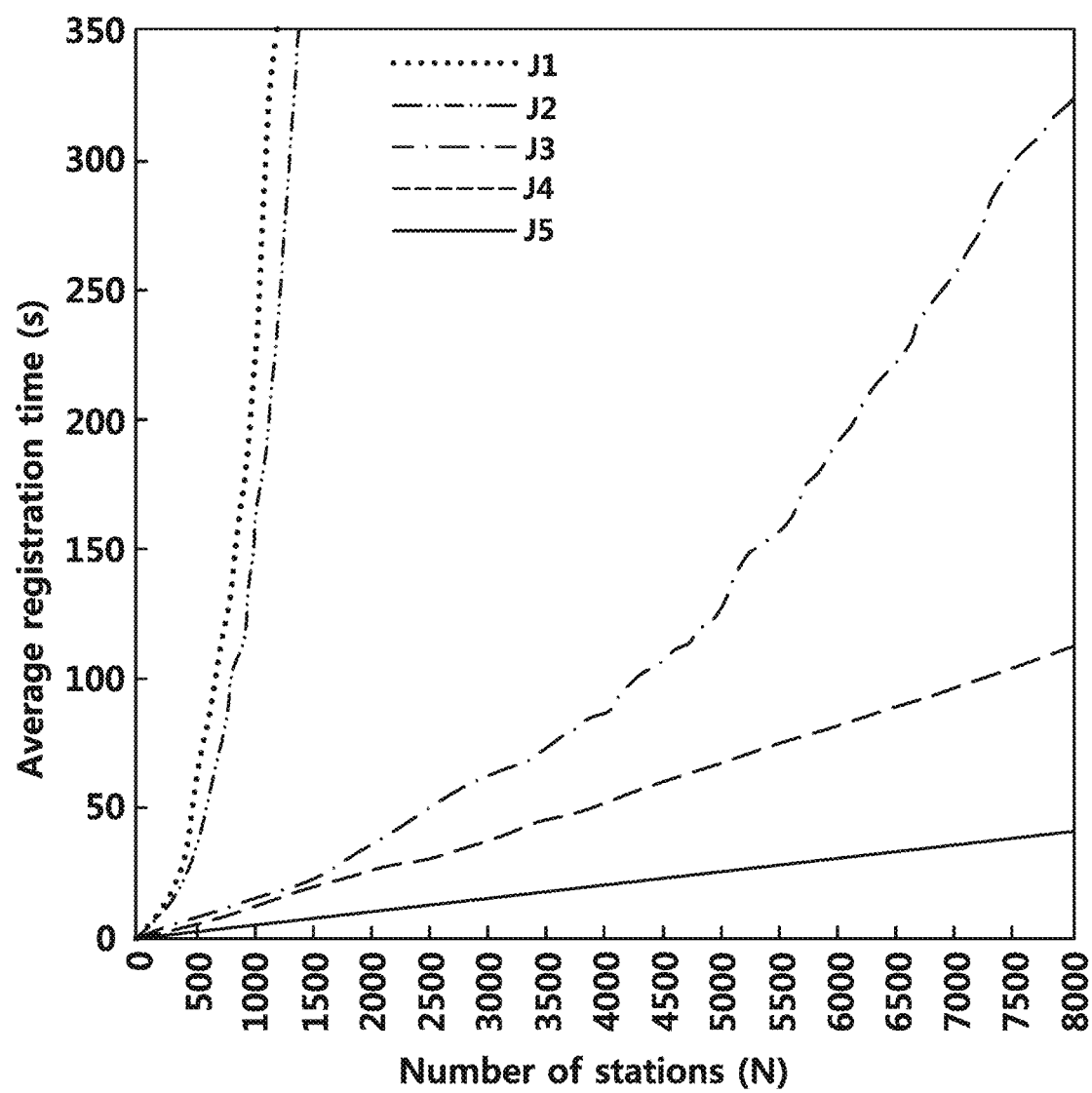
FIG. 12 is a graph of the number of devices and the average registration time that compares an embodiment of the present invention and different protocols.

FIG. 12 is a graph of the number of devices and the average registration time that compares an embodiment of the present invention and different protocols.

In FIG. 12, J1 is 802.11ah, J2 is CAA, J3 is CFT-ATA, J4 is CFTopt, and J5 is an embodiment of the present invention. According to an embodiment (J5), the time for registration is greatly reduced, compared to the existing protocols (J1 to J4). J5 (an embodiment) takes on average 64% and 87% less time, compared to J4 (CFTopt) and J3 (CFT-ATA), respectively.

Each station 100 selects a random value $U_R$ only on initialization, not in every BI. CFT-ATA (J3) needs a longer registration time because it has no waiting mode. Therefore, if $V_{ACT}$ reaches its maximum value, it may not overcome its optimal value. As illustrated in FIG. 12, both the CAA scheme (J1) and IEEE 802.11ah registration scheme show a rapid increase in registration time for the same fixed step size ($\Delta$).

In the CAA (J2) scheme, all registration procedures (including AuthReq/AuthResp and AssoReq/AssocResp) may be successfully executed by reserving a channel with the help of the Network Allocation Vector (NAV). Although it reserves the channel, since it considers only the CSMA/CA mechanism, massive contention is generated by heavy traffic.

Even though J2 use the CAC method and the combined authentication/association (CAA) technique to enhance performance, using a fixed step size ($\Delta$) makes a big difference in performance efficiency, compared to an embodiment of the present invention (J5). Similarly, IEEE 802.11ah (J1) also uses the CAC method, but it deals with contentions twice as well as the CAA scheme with similar limitations.

On the other hand, even in a large network with the total number of devices up to 8000, an embodiment (J5) of the present invention still maintains better performance than other protocols.

Figure 13A:
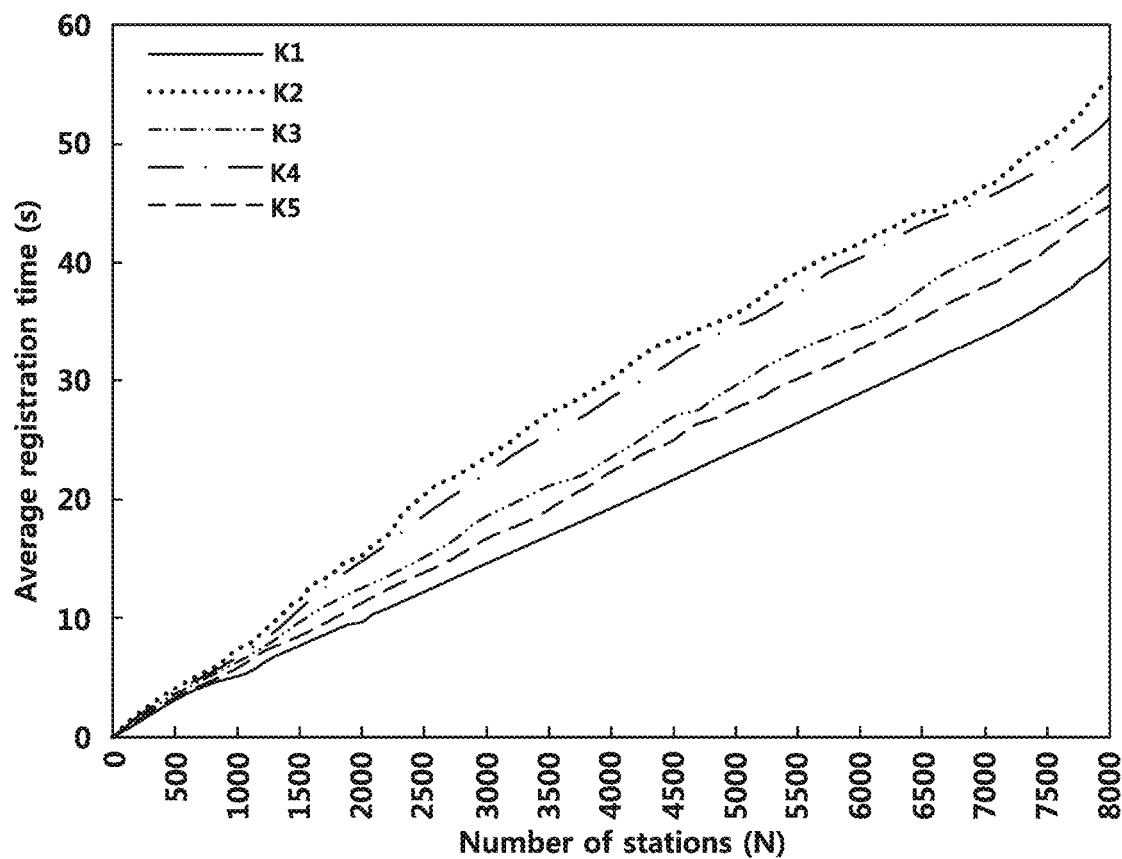
FIGS. 13A and 13B are graphs of average registration time for an embodiment of the present invention and other algorithms in related art.
Figure 13B:
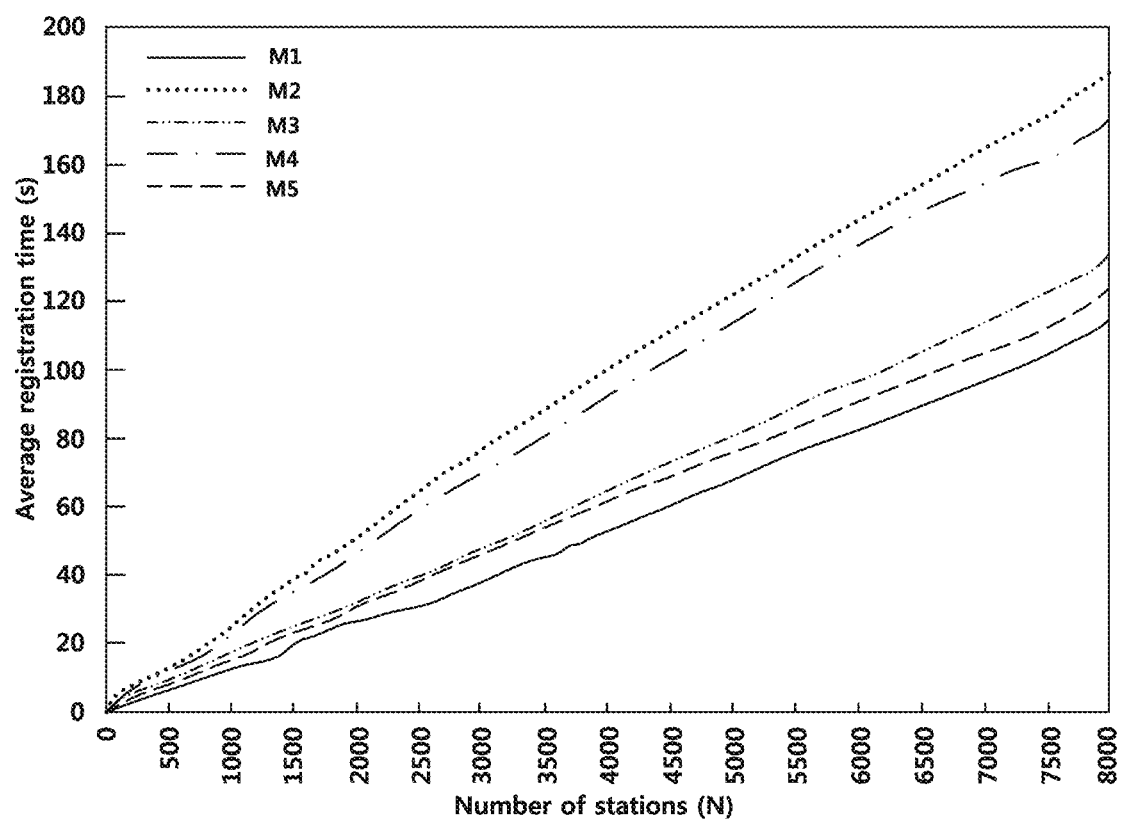

FIGS. 13A and 13B are graphs of average registration time for an embodiment of the present invention and other algorithms in related art.

FIG. 13A is a graph illustrating registration time according to an embodiment of the present invention. The optimal algorithm (K1) provides the best performance because it assumes the exact number of stations before starting a registration procedure. A station authentication apparatus 200 may provide the optimal step size ($\Delta_{opt}$) and obtain the maximum registrations in a BI, based on Equation 18.

Smart-up (K3) and smart-down (K5) algorithms outperform the up (K2) and down (K4) algorithms in both small and large networks.

That is because, firstly, a waiting mode initializes $V_{ACT}$ by half of the maximum value instead of the maximum value. The lesser value of $V_{ACT}$ allows a moderate number of stations to send authentication request frames (AuthReqs). Therefore, it takes less convergence time to switch from waiting mode to studying mode. Secondly, in studying mode, consideration of both $Q_L$ and $S_A$ allows more stations to select an optimal $\Delta$ for $V_{ACT}$. Finally, incrementing $V_{ACT}$ in working mode also allows more stations to take both request and response traffic. There is a small performance gap between the smart-up (K3) and smart-down (K5) algorithms, which allows more stations in studying mode in the smart-down algorithm than in the smart-up algorithm.

The optimal algorithm (K1) takes 37.5% less time than the up algorithm (K2), 30% less time than the down algorithm (K4), 15% less time than the smart-up algorithm (K3), and 12% less time than the smart-down algorithm (K5).

FIG. 13B is a graph of registration time when using CFT MAC, which is a related art.

Referring to FIG. 13B, CFTopt scheme (M1) shows the best performance. The registration time under CFTopt is 64% lower than CFT-Up (M2), 53% lower than CFT-Down (M4), 18% lower than CFT-Smart-Up (M3), and 10% lower than CFT-Smart-Down (M5).

However, the CFTopt (M1) takes more than about 110 seconds when stations are 8000, while K1 of FIG. 13A takes about 40 seconds, which is longer than an embodiment of the present invention.

Figure 14:
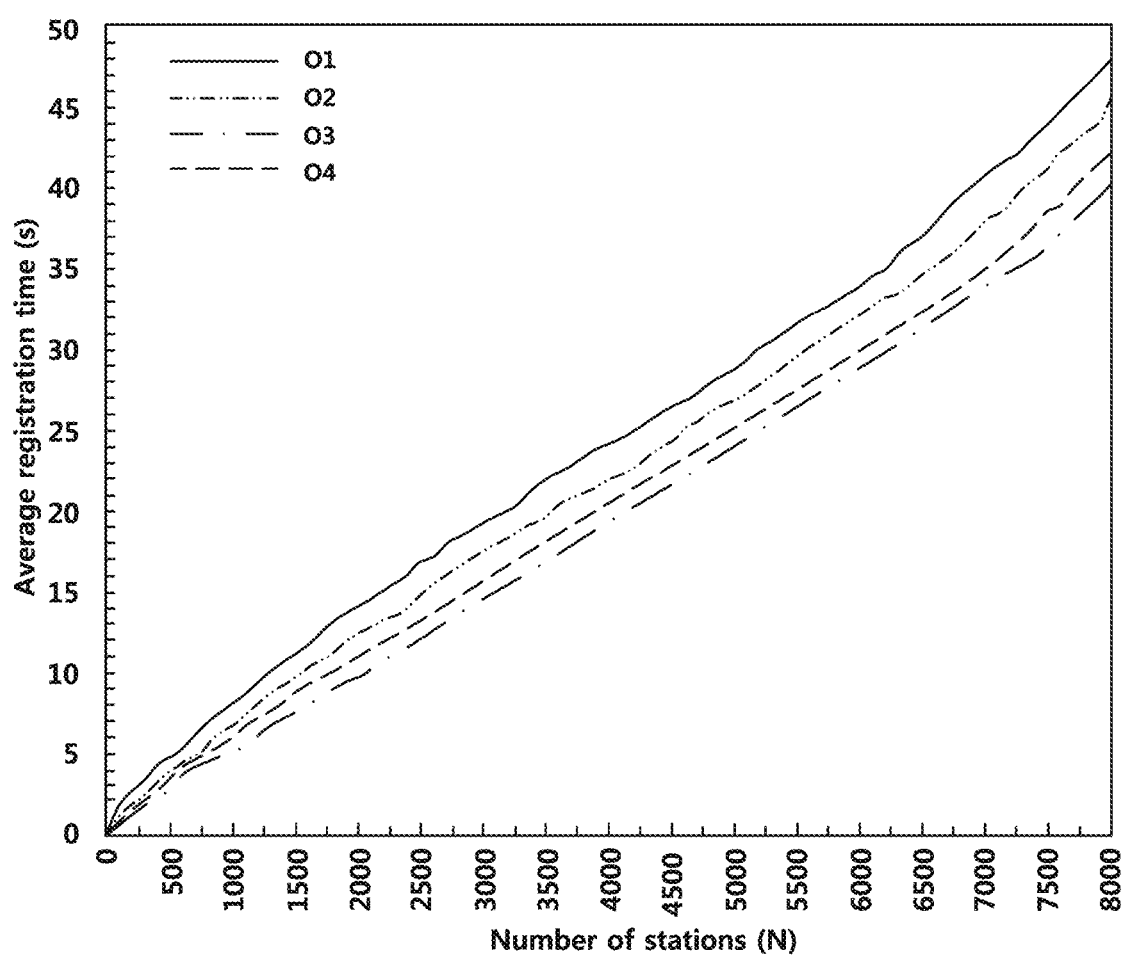
FIG. 14 is a graph of the number of stations and the average registration time according to one or more embodiments of the present invention in which the number of C-slots are differently set.

FIG. 14 is a graph of the number of stations and the average registration time according to one or more embodiments of the present invention in which the number of C-slots are differently set.

FIG. 14 shows the importance of the num_C_Slots in one SCP, which is one of the major differences from traditional CSMA/CA. In FIG. 14, O1, O2, O3 O4 refers to the num_C_slots of 1, 2, 3, 4, respectively.

According to one or more embodiments of the present invention, the SCP duration is partitioned into multiple mini-CSMA/CA access slots (C slots). A station authentication apparatus 200 assigns these slots with sequential numbering (C-Slots=1, . . . , num_C_Slots). Moreover, partition of the SCP duration creates sub-access groups from the access group to limit the number of stations participating in channel contention.

num_C_Slots=1 means there is no partition in the SCP duration. On the other hand, num_C_Slots=2 makes one partition, which provides two C-slots.

The traditional scheme in which the SCP duration is not partitioned considers all stations in an access group, so it generates a massive amount of contention. Therefore, the division of the SCP duration becomes important for all network sizes. O3, when num_C_Slots=3, needs 20% less registration time compared to O1, when num_C_Slots=1.

An optimal number for partitioning the SCP duration is also important. More partitioning reduces contention but increases channel overhead, with more conflict periods and an inter-slot gap, by providing a guard time. In FIG. 14, O3 provides a better performance than O4. As a result of simulation, num_C_Slots=3 was chosen as the optimal partition for a 100 ms BI.

The present disclosure has been described above with method steps illustrating the performance of specific functions and their relationships. The boundaries and order of these functional elements and method steps have been arbitrarily defined herein for convenience of explanation.

Alternative boundaries and sequences may be defined as long as the specific functions and relationships are properly performed. Any such alternative boundaries and sequences are therefore within the scope and spirit of the claimed invention.

In addition, the boundaries of these functional elements have been arbitrarily defined for ease of illustration. Alternative boundaries can be defined as long as certain important functions are performed properly. Likewise, the flowchart blocks may also be arbitrarily defined herein to denote any significant functionality.

For extended use, the flowchart block boundaries and order may have been defined and still perform some important function. Alternative definitions of both functional components and flowchart blocks and sequences are therefore within the scope and spirit of the claimed invention.

The present disclosure may also be described, at least in part, in the language of one or more embodiments. Embodiments of the present invention are used herein to describe the present invention, aspects thereof, features thereof, concepts thereof, and/or examples thereof. The physical embodiments of an apparatus, article of manufacture, machine, and/or process for implementing the invention may include one or more aspects, features, concepts, examples, etc., described with reference to one or more embodiments described herein.

Furthermore, in the entire drawings, embodiments may incorporate the same or similarly named functions, steps, modules, etc. that may use the same or different reference numerals, and so forth, steps, modules, etc., may be the same or similar functions, steps, modules, and so on, or other things.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the invention is defined not by the detailed description, but by the claims and their equivalents, and all variations within the scope of the claims and their equivalents are to be construed as being included in the invention.

What is claimed is:

1. An authentication apparatus for Internet of Things (IoT) station registration, comprising:
   a beacon frame transmitting unit of IoT access point (IoT AP) that transmits a beacon frame to a plurality of stations;
   a plurality of unregistered IoT stations each transmitting authentication request frames using only slotted Carrier Sense Multiple Access with Collision Avoidance (slotted-CSMA/CA); and
   an authentication unit of the IoT AP that:
      receives the authentication request frames, and
      transmits, using slotted Time Division Multiple Access (slotted-TDMA), an authentication request acknowledgement frame that includes:
         information of Time Division Multiple Access Slot (T-Slot) that is used in frame exchanges for authentication response that follow the authentication request frames;
         association request; and
         association response,
   wherein the beacon frame includes information on beacon interval, beacon period, authentication control threshold value, Medium Access Control (MAC) address for a non-registered station, and association identification of a registered station using a T-slot, a slotted-CSMA/CA period, a beginning of the slotted-CSMA/CA period, a number of total slotted-CSMA/CA slots (C-slots), and a duration of each C-slot, and
   wherein the authentication apparatus adjusts the slotted-CSMA/CA period and a slotted-TDMA period based on a number of authentication requests.

2. The authentication apparatus of claim 1, wherein the beacon frame transmitting unit increments or initializes the authentication control threshold value under a predetermined condition based on a management queue size of the authentication apparatus and a number of successful authentications and/or associations in a previous beacon interval.

3. The authentication apparatus of claim 1, wherein the beacon frame transmitting unit decrements or initializes the authentication control threshold value under a predetermined condition based on a previous authentication control threshold value, a management queue size of the authentication apparatus, and a number of successful authentications and/or associations in a previous beacon interval.

4. The authentication apparatus of claim 1,
   wherein the beacon frame further includes information on the slotted-TDMA period and a number of total T-slots, and
   wherein the beacon frame transmitting unit sets the slotted-CSMA/CA period and the slotted-TDMA period under a predetermined condition based on a number of total authentication requests and the number of total T-slots in a previous beacon interval.

5. A method for authentication and association of an apparatus for Internet of Things (IoT) registration, comprising:
   transmitting a beacon frame to a plurality of stations;
   receiving an authentication request frame from a plurality of stations in slotted Carrier Sense Multiple Access with Collision Avoidance (slotted-CSMA/CA);
   using slotted Time Division Multiple Access (slotted-TDMA), transmitting, to an IoT station that has sent the authentication request frame, an authentication request acknowledgement frame including:
      information of Time Division Multiple Access Slot (T-Slot) that is used in frame exchanges for authentication response that follow the authentication request frame;
      association request; and
      association response;
   transmitting a resource allocation frame using a beacon frame to the plurality of stations;
   receiving an association request frame from at least one of the plurality of stations receiving an association response frame out of the plurality of stations in the slotted-TDMA; and
   transmitting an association response frame to the station in the slotted-TDMA, wherein the beacon frame includes information on beacon interval, beacon period, authentication control threshold value, Medium Access Control (MAC) address for a non-registered station, association identification of a registered station using a T-slot, a slotted-CSMA/CA period, a beginning of the slotted-CSMA/CA period, a number of total C-slots, slotted-CSMA/CA slots (C-slots), and a duration of each C-slot, and wherein the apparatus adjusts the slotted-CSMA/CA period and a slotted-TDMA period based on a number of authentication requests.

6. The method of claim 5, wherein the beacon frame includes at least one of information on:

slotted Carrier Sense Multiple Access with Collision Avoidance, resource allocation for authentication response, association request, and association response, TDMA period, and authentication control threshold value.

7. The method of claim 6, wherein the transmission of the beacon frame comprises:

setting the authentication control threshold value to be incremented or initialized under a predetermined condition based on a management queue size of the apparatus and a number of successful authentications and/or associations in a previous beacon interval; and transmitting a beacon frame including the set authentication control threshold value to the plurality of stations.

8. The method of claim 6, wherein the transmission of the beacon frame comprises:

setting the authentication control threshold value to be incremented or initialized under a predetermined condition based on a management queue size of the apparatus, a number of successful authentications and/or associations in a previous beacon interval, and a previous authentication control threshold value; and transmitting a beacon frame including the set authentication control threshold value to the plurality of stations.

9. A method for authentication and association of an apparatus for Internet of Things (IoT) registration, comprising:

transmitting a beacon frame to a plurality of stations;

receiving an authentication request frame from each station receiving the beacon frame in slotted Carrier Sense Multiple Access with Collision Avoidance (slotted-CSMA/CA);

transmitting an authentication request acknowledgement frame including T-slot information used in slotted Time Division Multiple Access (slotted-TDMA);

transmitting an authentication response frame to a corresponding station in the slotted-TDMA;

receiving an association request frame from each station receiving the authentication response frame in the slotted-TDMA; and transmitting an association response frame to a corresponding station in the slotted-TDMA, wherein the beacon frame includes information on beacon interval, beacon period, authentication control threshold value, Medium Access Control (MAC) address for a non-registered station, association identification of a registered station using a T-slot, a slotted-CSMA/CA period, a beginning of the slotted-CSMA/CA period, a number of total C-slots, slotted-CSMA/CA slots (C-slots), and a duration of each C-slot, and wherein the apparatus adjusts the slotted-CSMA/CA period and a slotted-TDMA period based on a number of authentication requests.

10. The method of claim 9, before the transmission of the beacon frame, comprising adaptively adjusting duration of the slotted-CSMA/CA period and duration of the slotted-TDMA period, wherein the adjustment comprises:

setting a current slotted-CSMA/CA period under a predetermined condition; and setting a current slotted-TDMA period by subtracting the current slotted-CSMA/CA period and the beacon period from the beacon interval.

11. The method of claim 9, wherein the number of total C-slots is a number of C-slots included in one slotted-CSMA/CA period and is an integer greater than or equal to 2 and less than or equal to 4.

12. The method of claim 9, wherein the reception of the authentication request frame comprises:

generating a uniform random number in a predetermined range by each station receiving the beacon frame; and receiving, if the uniform random number is less than or equal to the authentication control threshold value, the station belongs to an access group, if the uniform random number is greater than the authentication control threshold value, the station belongs to a deferred group, transmitting the authentication request frame from the station that belongs to the access group in the slotted-CSMA/CA.

13. The method of claim 9, in the reception of each authentication request frame, wherein each of the plurality of stations receiving the beacon frame uses an Nth backoff slot selected by Sift geometric probability distribution and transmits the authentication request frame using slotted CSMA/CA (C-slot), where N is a natural number.

14. The method of claim 9, further comprising, before the transmission of the beacon frame, setting the authentication control threshold value to be incremented or initialized under a predetermined condition based on a management queue size of the apparatus and a number of successful authentications and/or associations in a previous beacon interval.

15. The method of claim 9, further comprising, before the transmission of the beacon frame, setting the authentication control threshold value to be decremented or initialized under a predetermined condition based on a management queue size of the apparatus, a number of successful authentications and/or associations in a previous beacon interval, and a previous authentication control threshold value.

* * * * *